US012126070B2

(12) United States Patent
Mori et al.

(10) Patent No.: US 12,126,070 B2
(45) Date of Patent: Oct. 22, 2024

(54) ANTENNA MODULE AND COMMUNICATION DEVICE EQUIPPED WITH THE SAME

(71) Applicant: Murata Manufacturing Co., Ltd., Nagaokakyo (JP)

(72) Inventors: Hirotsugu Mori, Nagaokakyo (JP); Yoshiaki Hasegawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 268 days.

(21) Appl. No.: 17/680,359

(22) Filed: Feb. 25, 2022

(65) Prior Publication Data

US 2022/0181766 A1 Jun. 9, 2022

Related U.S. Application Data

(63) Continuation of application No. PCT/JP2020/018520, filed on May 7, 2020.

(30) Foreign Application Priority Data

Aug. 27, 2019 (JP) ................................ 2019-154919

(51) Int. Cl.
*H01Q 1/22* (2006.01)
*H01Q 1/38* (2006.01)

(52) U.S. Cl.
CPC ......... *H01Q 1/2208* (2013.01); *H01Q 1/2283* (2013.01); *H01Q 1/38* (2013.01)

(58) Field of Classification Search
CPC ...... H01Q 1/2208; H01Q 1/2283; H01Q 1/38; H01Q 13/08; H01Q 13/10; H01Q 23/00;
(Continued)

(56) References Cited

U.S. PATENT DOCUMENTS 9,715,609 B1 * 7/2017 Fink ....................... H01Q 25/00
2008/0144689 A1 * 6/2008 Crouch .................... H01Q 3/26
372/57

(Continued)

FOREIGN PATENT DOCUMENTS

JP 2004-88508 A 3/2004
JP 2004-254179 A 9/2004

(Continued)

OTHER PUBLICATIONS

International Search Report and Written Opinion mailed on Jul. 21, 2020, received for PCT Application PCT/JP2020/018520, Filed on May 7, 2020, 14 pages including English Translation.

*Primary Examiner* — Thien M Le
(74) *Attorney, Agent, or Firm* — XSENSUS LLP

(57) ABSTRACT

An antenna module includes a radiation element having feeding points, feeding wiring lines, and directional couplers. The feeding wiring line transmits a radio frequency signal from the RFIC to the feeding point. The feeding wiring line transmits a radio frequency signal from the RFIC to the feeding point. The directional coupler detects a radio frequency signal to be supplied to the radiation element through the feeding wiring line. The directional coupler detects a radio frequency signal to be supplied to the radiation element through the feeding wiring line. A polarization direction of a radio wave to be radiated with the radio frequency signal supplied to the feeding point is different from a polarization direction of a radio wave to be radiated with the radio frequency signal supplied to the feeding point.

16 Claims, 22 Drawing Sheets

(58) Field of Classification Search
CPC ........ H01Q 25/001; H01Q 3/26; H01Q 5/378; H01Q 9/0414
See application file for complete search history.

(56) References Cited

U.S. PATENT DOCUMENTS

| | | | | |
|---|---|---|---|---|
| 2009/0315634 | A1* | 12/2009 | Sertel | H01P 1/184 333/1 |
| 2010/0171674 | A1* | 7/2010 | Henderson | H01Q 21/0037 343/778 |
| 2010/0259326 | A1* | 10/2010 | Corman | H01Q 3/34 330/124 R |
| 2013/0157601 | A1* | 6/2013 | O'Keeffee | H01Q 3/36 455/226.1 |
| 2015/0255867 | A1* | 9/2015 | Inoue | H01Q 21/065 343/853 |
| 2015/0333411 | A1* | 11/2015 | Wang | H01Q 21/0075 343/879 |
| 2017/0346182 | A1* | 11/2017 | Martikkala | H01Q 3/267 |
| 2017/0373368 | A1 | 12/2017 | Srirattana et al. | |
| 2019/0268046 | A1* | 8/2019 | Kim | H01Q 21/0006 |
| 2021/0351507 | A1* | 11/2021 | Gorbachov | H01Q 21/24 |

FOREIGN PATENT DOCUMENTS

| | | | |
|---|---|---|---|
| JP | 2013-126066 | A | 6/2013 |
| JP | 2018-82277 | A | 5/2018 |
| JP | 2019-9544 | A | 1/2019 |
| JP | 2019-220861 | A | 12/2019 |
| WO | 2018/230475 | A1 | 12/2018 |

* cited by examiner (a)

(b)

ANTENNA MODULE AND COMMUNICATION DEVICE EQUIPPED WITH THE SAME

CROSS REFERENCE TO RELATED APPLICATIONS

The present application is a continuation application of International Patent Application No. PCT/JP2020/018520, filed May 7, 2020, which claims priority to Japanese patent application JP 2019-154919, filed Aug. 27, 2019, the entire contents of each of which being incorporated herein by reference.

TECHNICAL FIELD

The present disclosure relates to an antenna module and a communication device equipped with the antenna module, and more particularly, relates to a structure of an antenna module including a directional coupler for detecting radio waves to be radiated from an antenna.

BACKGROUND ART

Japanese Unexamined Patent Application Publication No. 2013-126066 (Patent Document 1) discloses an on-board wireless device equipped with a directional coupler for detecting a reflected wave of an antenna terminal. The wireless device disclosed in Japanese Unexamined Patent Application Publication No. 2013-126066 (Patent Document 1) is configured such that an inductor component of a wiring pattern forming the directional coupler serves as a part of an inductor component of an antenna matching circuit, thereby allowing the number of components to be reduced.

CITATION LIST

Patent Document

Patent Document 1: Japanese Unexamined Patent Application Publication No. 2013-126066

SUMMARY

Technical Problems

By detecting a radio wave by using the directional coupler, an output gain or a waveform is adjusted, thereby allowing communication quality to be improved.

On the other hand, as recognized by the present inventor, the above-described on-board communication device or a portable terminal represented by a smartphone is required to further improve its communication quality, and as one method thereof, a configuration in which radio waves having polarization directions different from each other can be radiated from one radiation element may be employed. Even in the antenna module having such a configuration, it is required to detect radio waves to be radiated in order to improve its communication quality.

The present disclosure has been made to solve the above-identified, and other, problems, and an aspect of the present disclosure is, in an antenna module being capable of radiating radio waves in a plurality of different polarization directions, to appropriately detect a radio wave in each polarization direction.

Solution to Problem

An antenna module according to an aspect of the present disclosure includes a radiation element including a first feeding section and a second feeding section, first and second feeding wiring lines, and first and second directional couplers. The first feeding wiring line transmits a radio frequency signal from a feeding circuit to the first feeding section. The second feeding wiring line transmits a radio frequency signal from the feeding circuit to the second feeding section. The first directional coupler detects a radio frequency signal to be supplied to the radiation element through the first feeding wiring line. The second directional coupler detects a radio frequency signal to be supplied to the radiation element through the second feeding wiring line. A polarization direction of a radio wave to be radiated with the radio frequency signal supplied to the first feeding section is different from a polarization direction of a radio wave to be radiated with the radio frequency signal supplied to the second feeding section.

Advantageous Effects

According to the antenna module of the present disclosure, in the antenna module being capable of radiating radio waves in the plurality of different polarization directions, it is possible to appropriately detect a radio wave in each polarization direction.

DESCRIPTION OF EMBODIMENTS

Figure 1:
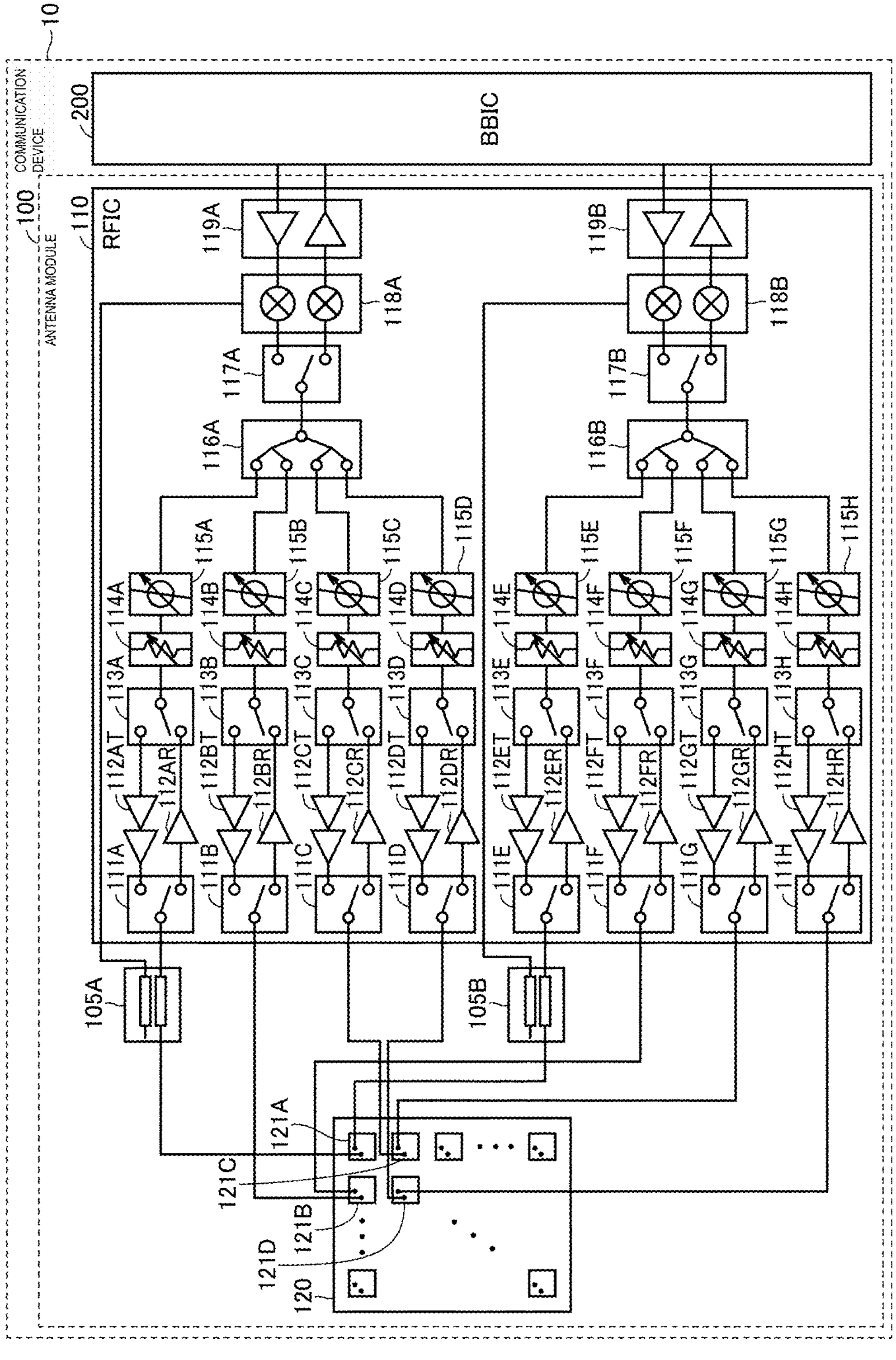
FIG. 1 is a block diagram of a communication device to which an antenna module according to Embodiment 1 is applied.

Hereinafter, embodiments of the present disclosure will be described in detail with reference to the drawings. Note that, in the drawings, the same or corresponding portions are denoted by the same reference signs, and description thereof will not be repeated.

Embodiment 1

(Configuration of Communication Device)

FIG. 1 is a block diagram of a communication device 10 (having transceiver circuitry) to which an antenna module 100 according to Embodiment 1 is applied. With reference to FIG. 1, the communication device 10 includes the antenna module 100 and a baseband integrated circuit (BBIC) 200. The antenna module 100 includes a radio frequency integrated circuit (RFIC) 110, an antenna unit 120, and directional couplers 105A and 105B.

The antenna unit 120 is a so-called dual polarization type antenna unit being capable of radiating two different polarized waves from a radiation element (feeding element 121), and a radio frequency signal for a first polarized wave and a radio frequency signal for a second polarized wave are supplied from the RFIC 100 to each of the feeding elements 121 (121A to 121D).

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, a signal multiplexer/demultiplexer 116A and a signal multiplexer/demultiplexer 116B, mixers 118A and 118B, and amplifier circuits 119A and 119B. Among these, the configurations of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are circuits for radio frequency signals for first polarized waves. In addition, the configurations of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are circuits for radio frequency signals for second polarized waves.

In a case of transmitting radio frequency signals, the switches 111A to 111H and 113A to 113H are switched to sides of the power amplifiers 112AT to 112HT, and the switches 117A and 117B are connected to transmission-side amplifiers of the amplifier circuits 119A and 119B. In a case of receiving radio frequency signals, the switches 111A to 111H and 113A to 113H are switched to sides of the low-noise amplifiers 112AR to 112HR, and the switches 117A and 117B are connected to reception-side amplifiers of the amplifier circuits 119A and 119B.

Signals transmitted from the BBIC 200 are amplified by the amplifier circuits 119A and 119B and up-converted by the mixers 118A and 118B. Transmission signals that are the up-converted radio frequency signals are divided into four signals by the signal multiplexer/demultiplexer 116A and the signal multiplexer/demultiplexer 116B, and the divided transmission signals pass through corresponding signal paths, and are fed to different feeding elements 121.

Radio frequency signals from the switches 111A and 111E are supplied to the feeding element 121A. Similarly, radio frequency signals from the switches 111B and 111F are supplied to the feeding element 121B. Radio frequency signals from the switches 111C and 111G are supplied to the feeding element 121C. Radio frequency signals from the switches 111D and 111H are supplied to the feeding element 121D.

Directivity of the antenna unit 120 can be adjusted by individually adjusting degrees of phase shifting of the phase shifters 115A to 115H disposed in the respective signal paths.

Reception signals that are radio frequency signals received by the respective feeding elements 121 are transmitted to the RFIC 110, and are multiplexed in the signal multiplexer/demultiplexer 116A and the signal multiplexer/demultiplexer 116B through four different signal paths. The multiplexed reception signals are down-converted by the mixers 118A and 118B, and the down-converted reception signals are amplified by the amplifier circuits 119A and 119B to be transmitted to the BBIC 200.

The directional couplers 105A and 105B are devices for detecting radio frequency signals to be supplied from the RFIC 110 to the feeding elements 121. Note that, in the following description, the directional couplers 105A and 105B may be collectively referred to as a "directional coupler 105".

The directional coupler 105 is configured to include a main line formed in a part of a feeding wiring line for transmitting a radio frequency signal from the RFIC 110 to the feeding element 121, and a sub line disposed parallel to the main line. The sub line is connected to the mixers 118A and 118B of the RFIC 110. In the mixers 118A and 118B, while radio waves are radiated from the feeding element 121, detection signals from the directional couplers 105 are introduced into reception-side circuits to be transmitted to the BBIC 200.

Note that, in the example of FIG. 1, the directional couplers 105A and 105B are individually formed on the feeding wiring lines of respective polarized waves for supplying radio frequency signals to the feeding element 121A, but instead of and/or in addition to this, directional couplers may be formed on feeding wiring lines corresponding to another feeding element.

(Configuration of Directional Coupler)

Figure 2:
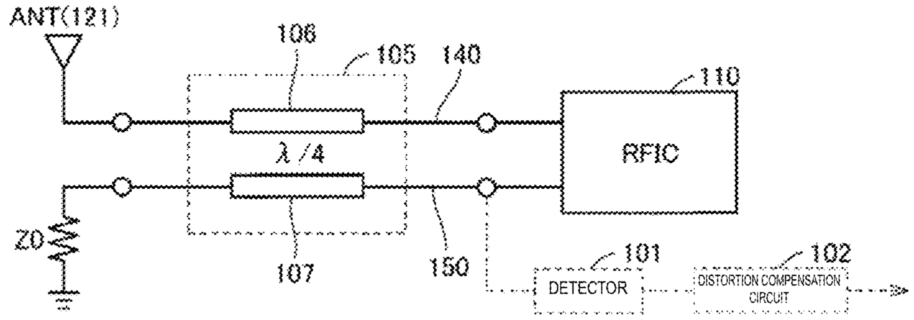
FIG. 2 is a diagram for explaining a configuration of a first example of a directional coupler.

FIG. 2 is a diagram for explaining a configuration of the directional coupler 105. With reference to FIG. 2, the directional coupler 105 includes a main line 106 formed on a feeding wiring line 140 for supplying a radio frequency signal from the RFIC 110 to an antenna ANT (the feeding element 121), and a sub line 107 formed on a coupling line 150 disposed parallel to the feeding wiring line 140. When a wavelength of a radio frequency signal to be supplied from the RFIC 110 is λ, lengths of the main line 106 and the sub line 107 are set to λ/4. One end of the sub line 107 is connected to a ground potential with an impedance element Z0 interposed therebetween. The other end of the sub line 107 is connected to the RFIC 110. The impedance element Z0 is desirably set to an impedance at which a phase of a signal from the sub line 107 and a phase of a signal reflected by a grounding end are opposite to each other.

Note that the impedance element is configured to include at least one of a resistor, a capacitor, and an inductor.

With such a configuration, when a radio frequency signal is supplied to the main line 106, the main line 106 and the sub line 107 are electromagnetically coupled to each other, whereby a signal corresponding to the radio frequency signal is generated in the coupling line 150. The signal generated in the coupling line 150 is fed back to the BBIC 200 via the RFIC 110. In the BBIC 200, based on the signal detected in the directional coupler 105, radiation power of a radio wave radiated from the antenna ANT, distortion of the radiated radio wave, or the like is detected, and adjustment of the gain of a power amplifier in the RFIC 110, adjustment of the waveform of a radio frequency signal to be supplied to the antenna ANT, and the like are performed.

Note that the signal detected in the directional coupler 105 do not necessarily pass through the RFIC 110, and as indicated by the broken lines in FIG. 2; the signal from the coupling line 150 may be directly detected by using a detector 101 (that detects radiated power and/or signal distortion) provided outside the RFIC 110, and the detected signal may be processed by using a distortion compensation circuit 102 or the like.

Figure 3:
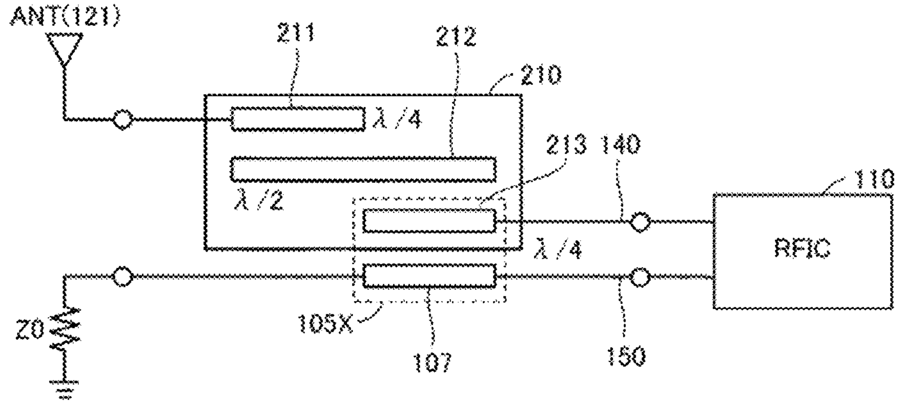
FIG. 3 is a diagram for explaining a configuration of a second example of the directional coupler.

In a configuration in which a resonant line-type filter is disposed between the RFIC 110 and the antenna ANT, a directional coupler may be formed by using a line that has a length of λ/4 and that is included in the resonant line-type filter. FIG. 3 is a diagram for explaining an example of a directional coupler 105X in the configuration in which the resonant line-type filter is disposed.

In the configuration of FIG. 3, a resonant line-type filter 210 is disposed on the feeding wiring line 140 connecting the RFIC 110 and the antenna ANT. The resonant line-type filter 210 is configured to include a line 211 that has a length of λ/4 and that is connected to the antenna ANT, a line 213 that has a length of λ/4 and that is connected to the RFIC 110, and a line 212 that has a length of λ/2 and that is disposed between and parallel to the lines 211 and 213.

Then, the sub line 107 is disposed in parallel to the line 213 of the resonant line-type filter 210, and the directional coupler 105X is formed of the line 213 and the sub line 107.

The line 212 that has the length of λ/2 and that is included in the resonant line-type filter may be used as a main line and may be electromagnetically coupled to the sub line 107 having a length of λ/4 to form a directional coupler.

(Configuration of Antenna Module)

Figure 4:
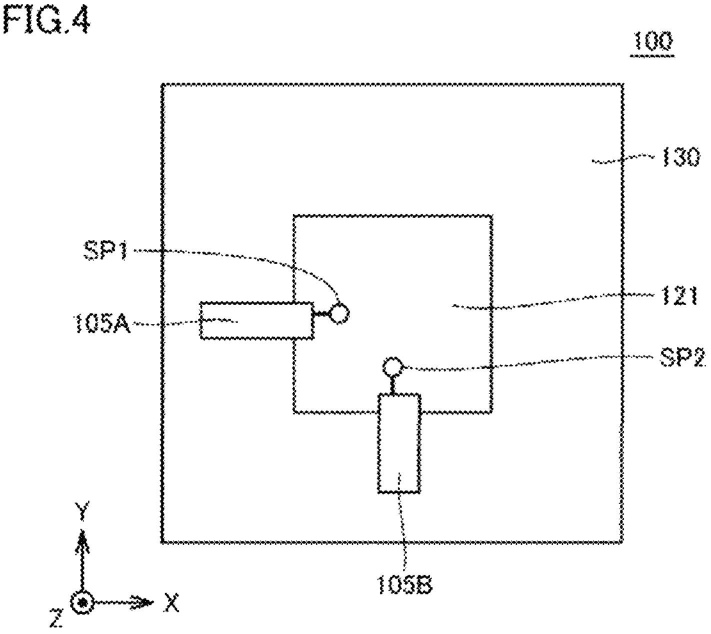
FIG. 4 is a plan view of the antenna module of FIG. 1.

Next, a detailed configuration of the antenna module 100 according to Embodiment 1 will be described with reference to FIG. 4 and FIG. 5. Note that, in FIG. 4 and FIG. 5, for ease of description, a case where one feeding element 121 is formed will be described. FIG. 4 illustrates a plan view of the antenna module 100, and FIG. 5 illustrates a side perspective view of the antenna module 100.

Figure 5:
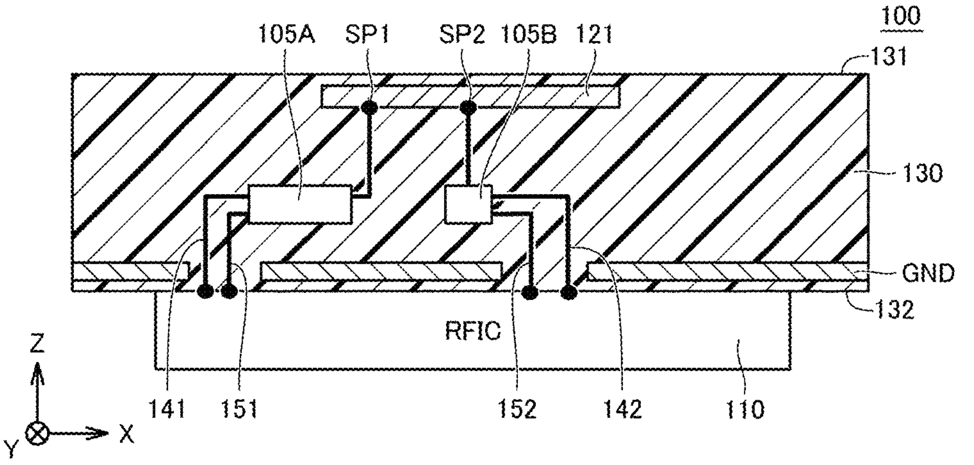
FIG. 5 is a side perspective view of the antenna module of FIG. 1.

With reference to FIG. 4 and FIG. 5, the antenna module 100 includes, in addition to the feeding element 121, the RFIC 110, and the directional couplers 105A and 105B, a dielectric substrate 130, feeding wiring lines 141 and 142, coupling lines 151 and 152, and a ground electrode GND. Note that, in the following description, a normal direction (a radiation direction of a radio wave) of the dielectric substrate 130 is defined as a Z-axis direction, and a plane perpendicular to the Z-axis direction is defined by an X-axis and a Y-axis. A positive direction and a negative direction of a Z-axis in each drawing may be referred to as an upper side and a lower side, respectively.

The dielectric substrate 130 is, for example, a low temperature co-fired ceramics (LTCC) multilayer substrate, a multilayer resin substrate formed by laminating a plurality of resin layers made of resin such as epoxy or polyimide, a multilayer resin substrate formed by laminating a plurality of resin layers made of liquid crystal polymer (LCP) having a lower dielectric constant, a multilayer resin substrate formed by laminating a plurality of resin layers made of fluorine-based resin, or a ceramic multilayer substrate other than LTCC. Note that the dielectric substrate 130 does not necessarily have a multilayer structure, and may be a single-layer substrate.

The dielectric substrate 130 has a substantially rectangular cross-section, and the feeding element 121 is disposed on an upper surface 131 (a surface in the positive direction of the Z-axis) or, as illustrated in FIG. 2, in an inner layer than the upper surface 131. The feeding element 121 is a patch antenna having a substantially square planar shape.

In the dielectric substrate 130, a ground electrode GND having a flat plate-shape is disposed at a lower side than the feeding element 121. In FIG. 5, the ground electrode GND is disposed in an inner layer being close to a lower surface 132 (a surface in the negative direction of the Z-axis) of the dielectric substrate 130.

The RFIC 110 is mounted on the lower surface 132 of the dielectric substrate 130 with solder bumps interposed therebetween (not illustrated). Note that the RFIC 110 may be connected to the dielectric substrate 130 by using a multipolar connector instead of the solder connection.

The directional couplers 105A and 105B are formed in a layer of the dielectric substrate 130 between the feeding element 121 and the ground electrode GND. The feeding wiring line 141 (first feeding wiring line) is connected to a feeding point SP1 (first feeding point) of the feeding element 121 from the RFIC 110 via the main line of the directional coupler 105A (first directional coupler). Further, the feeding wiring line 142 (second feeding wiring line) is connected to a feeding point SP2 (second feeding point) of the feeding element 121 from the RFIC 110 via the main line of the directional coupler 105B (second directional coupler).

The sub line of the directional coupler 105A is connected to the RFIC 110 by using a coupling line 151. The sub line of the directional coupler 105B is connected to the RFIC 110 by using a coupling line 152. The main line and the sub line of each directional coupler may be arranged in parallel in the same layer of the dielectric substrate 130 or may be arranged in parallel in a vertical direction in different layers.

In the examples of FIG. 4 and FIG. 5, the feeding point SP1 of the feeding element 121 is arranged at a position offset from the center of the feeding element 121 in the negative direction of the X-axis. Thus, by supplying a radio frequency signal to the feeding wiring line 141, a radio wave having a polarization direction in the X-axis direction is radiated from the feeding element 121. In addition, the feeding point SP2 of the feeding element 121 is disposed at a position offset from the center of the feeding element 121 in the negative direction of the Y-axis. Accordingly, by supplying a radio frequency signal to the feeding wiring line 142, a radio wave having a polarization direction in the Y-axis direction is radiated from the feeding element 121.

Wiring patterns and vias forming the feeding elements, the ground electrode, the feeding wiring lines, the coupling wiring lines, and the main lines and the sub lines in the directional couplers are formed of metal containing aluminum (Al), copper (Cu), gold (Au), silver (Ag), or an alloy thereof as a main component.

As in the antenna module 100 according to Embodiment 1, in the antenna module 100 being a dual polarization type and being capable of radiating two polarized waves, it is necessary to ensure isolation between radio frequency signals that are supplied to the respective feeding points. Further, as in the antenna module 100 according to Embodiment 1, in the configuration having two directional couplers, since the sub lines in the directional couplers are formed corresponding to the respective feeding wiring lines, it is necessary to ensure isolation between the two sub lines and between one sub line and the main line (feeding wiring line) of the other transmission path.

As illustrated in FIG. 4, the directional coupler 105A is disposed such that the main line and the sub line extend in the X-axis direction in plan view of the antenna module 100 from the normal direction of the dielectric substrate 130 (or the feeding element 121). Further, the directional coupler 105B is disposed such that the main line and the sub line extend in the Y-axis direction in plan view of the dielectric substrate 130 from the normal direction. As described above, by arranging the respective directional couplers such that an extending direction of the directional coupler 105A and an extending direction of the directional coupler 105B are orthogonal to each other, it is possible to suppress electromagnetic coupling between the sub lines and electromagnetic coupling between one sub line and the other main line. As a result, isolation between the signal transmission paths of two polarized waves can be ensured. Note that the "extending direction of the directional coupler" refers to a direction in which mainly coupling lines extend in the main line and the sub line.

Note that although FIG. 4 illustrates an example in which the directional couplers 105A and 105B are disposed so as to partially overlap the feeding element 121 in plan view of the dielectric substrate 130 from the normal direction, the directional couplers 105A and 105B do not need to overlap the feeding element 121 as long as there is a size margin in the dielectric substrate 130. In other words, the antenna module 100 can be reduced in size by arranging the directional couplers 105A and 105B so as to partially overlap the feeding element 121.

In the description of Embodiment 1 and the following description, a "feeding point" (a first feeding point, a second feeding point, and the like) at which a feeding wiring line is connected to a radiation element corresponds to a "feeding section" (a first feeding section, a second feeding section, and the like) in the present disclosure.

Modification 1

In the antenna module 100 of Embodiment 1, the configuration in which the directional coupler 105 is disposed between the feeding element 121 and the ground electrode GND has been described. In such a configuration, in particular, as illustrated in FIG. 4, in a case where the directional coupler 105 and the feeding element 121 are disposed so as to overlap each other in plan view of the dielectric substrate 130 from the normal direction, coupling between the feeding element 121 and the directional coupler 105 may occur.

Figure 6:
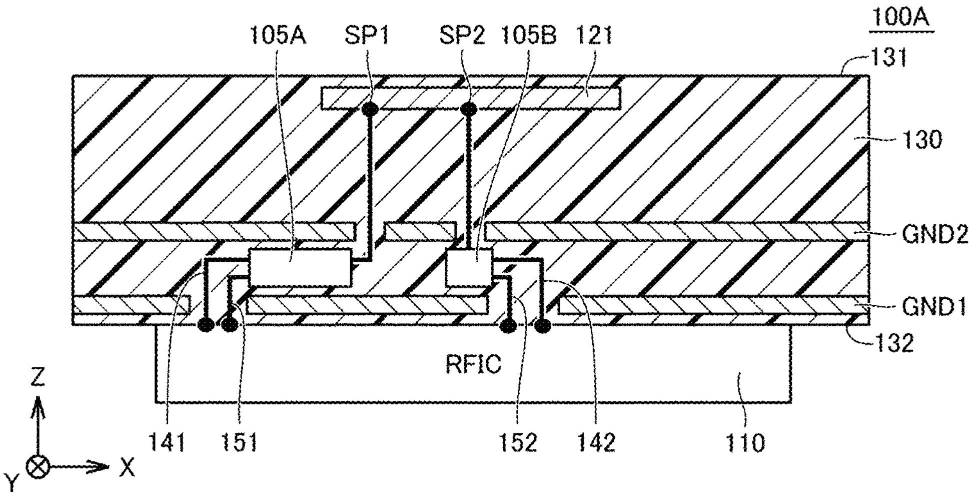
FIG. 6 is a side perspective view of an antenna module according to Modification 1.

The adjustment of an impedance or the like can be performed by using coupling between the feeding element 121 and the directional coupler 105, but when it is desired to suppress coupling between the feeding element 121 and the directional coupler 105, the directional coupler 105 may be disposed at a lower side than the ground electrode as in an antenna module 100A according to Modification 1 of FIG. 6.

In FIG. 6, a ground electrode GND1 is disposed in a layer close to the lower surface 132 of the dielectric substrate 130, and a ground electrode GND2 is disposed in a layer between the feeding element 121 and the ground electrode GND1. Additionally, the directional couplers 105A and 105B are formed in a layer between the ground electrode GND1 and the ground electrode GND2.

With such a configuration, coupling between the directional couplers 105A and 105B and the feeding element 121 can be suppressed.

Embodiment 2

In Embodiment 1, in plan view of the antenna module from the normal direction of the dielectric substrate, the two directional couplers are disposed so as to extend in different directions to ensure isolation from each other.

In Embodiment 2, a configuration in which two directional couplers extend in the same direction to ensure isolation between the two directional couplers will be described.

Figure 7:
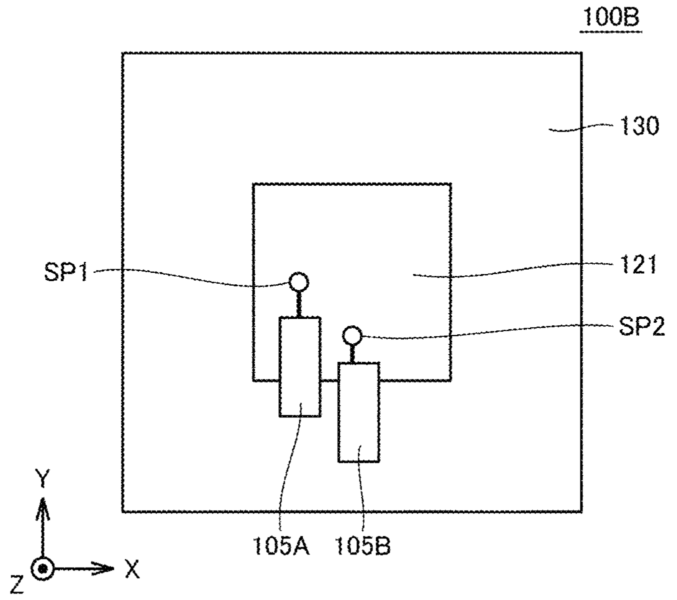
FIG. 7 is a plan view of an antenna module according to Embodiment 2.
Figure 8:
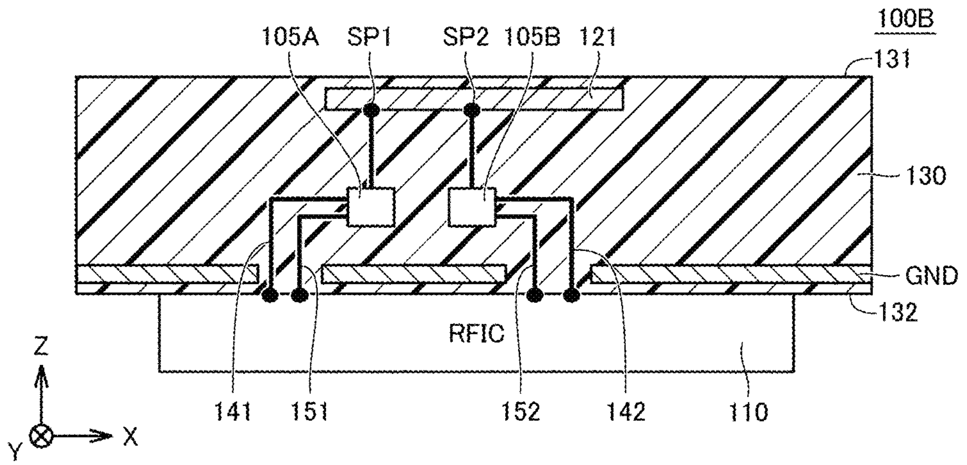
FIG. 8 is a side perspective view of the antenna module of FIG. 7.

FIG. 7 and FIG. 8 are respectively a plan view and a side perspective view of an antenna module 100B according to Embodiment 2. Note that, elements, in FIG. 7 and FIG. 8, being identical to those of FIG. 4 and FIG. 5 of Embodiment 1 will not be described repeatedly.

With reference to FIG. 7 and FIG. 8, the antenna module 100B has a configuration in which both the directional coupler 105A formed on the feeding wiring line 141 that supplies a radio frequency signal to the feeding point SP1 of the feeding element 121 and the directional coupler 105B formed on the feeding wiring line 142 that supplies a radio frequency signal to the feeding point SP2 extend in the Y-axis direction. In such a configuration, since the wiring lines can be routed in the same direction toward the RFIC 110, there is an advantage that the entire wiring line length of the feeding wiring lines can be shortened. However, since the lines included in the directional coupler are arranged parallel to each other, isolation between detection signals detected in the directional coupler becomes a problem.

The antenna module 100B according to Embodiment 2 has a configuration in which two sub lines are not arranged between main lines of two directional couplers arranged in parallel. In other words, at least one of the sub lines is disposed at a position different from that between the two main lines.

In general, when two main lines are arranged in parallel, in order to prevent interference between radio frequency signals in respective polarization directions, a distance between the two main lines is set to be a distance at which isolation between the two main lines can be ensured. Thus, when two sub lines are arranged in parallel between the two main lines, signals detected in the respective sub lines may interfere with each other. Thus, by arranging at least one of the sub lines at a position different from a region between the two main lines, a distance between the two sub lines can be set to be at least equal to or larger than the distance between the two main lines, so that isolation between the sub lines can be ensured.

Figure 9:
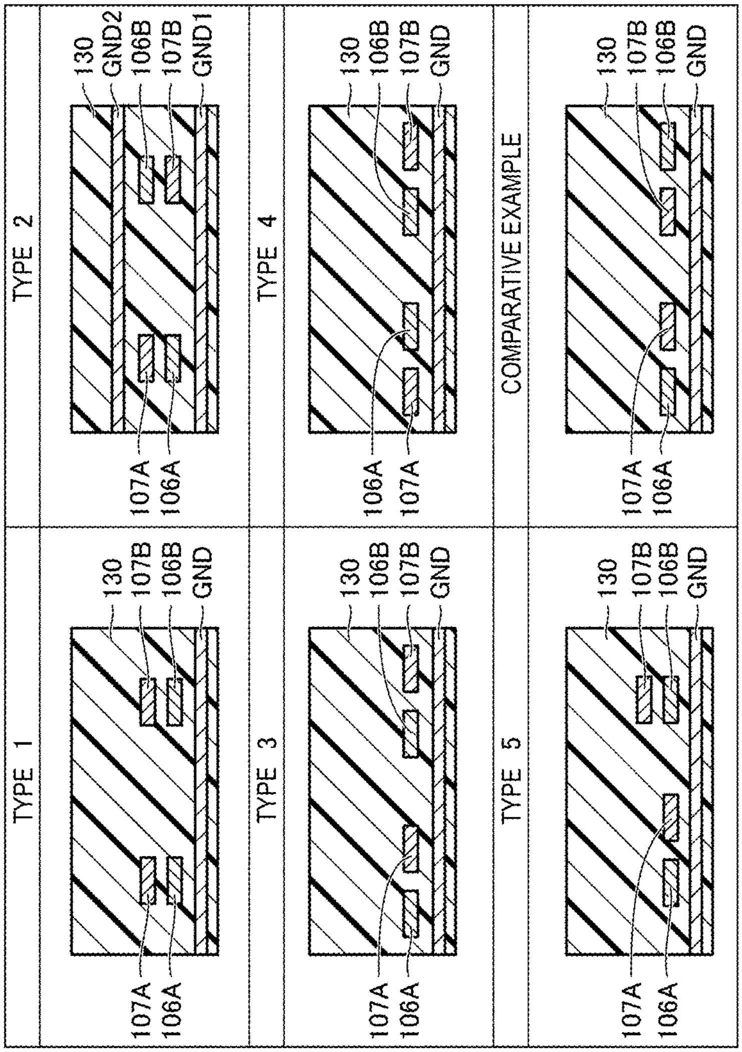
FIG. 9 is a diagram illustrating examples of arrangement of main lines and sub lines of two directional couplers.

FIG. 9 is a diagram illustrating examples of arrangement of main lines and sub lines of two directional couplers according to Embodiment 2. In FIG. 9, arrangement examples of Type 1 to Type 5 are illustrated. Note that a comparative example in which two sub lines are formed between two main lines is also illustrated.

In the examples of Type 1 and Type 2, in each directional coupler, the sub line is arranged in parallel to the main line in different layer from that of the main line in the Z direction. In Type 1, a sub line 107A (first sub line) is disposed at a position separated from a main line 106A (first main line) of a directional coupler 105A in the positive direction of the Z-axis. Regarding a directional coupler 105B, a main line 106B (second main line) is disposed in parallel to the main line 106A of the directional coupler 105A in the same layer, and a sub line 107B (second sub line) is disposed in parallel to the sub line 107A of the directional coupler 105A in the same layer. A distance between the sub line 107A and the sub line 107B is substantially the same as a distance between the main line 106A and the main line 106B. Since the main lines 106A and 106B are separated from each other by a distance that can ensure isolation, isolation between the sub lines 107A and 107B is also ensured.

Further, in Type 2, the sub line 107B of the directional coupler 105B is disposed in parallel to the main line 106A of the directional coupler 105A in the same layer, and the main line 106B of the directional coupler 105B is disposed in parallel to the sub line 107A of the directional coupler 105A in the same layer. Note that, in Type 2, the directional couplers 105A and 105B are disposed in a layer between the ground electrode GND1 and the ground electrode GND2 such that distance relationships between the ground potential and the main line and between the ground potential and the sub line are the same. In the configuration of Type 2, the sub line 107A and the sub line 107B are disposed in different layers, and a distance between the sub lines is larger than or equal to the distance between the main line 106A and the main line 106B, thereby ensuring isolation between the sub lines 107A and 107B.

The examples of Type 3 and Type 4 are examples in which all of the main lines and the sub lines included in the directional couplers 105A and 105B are disposed in the same layer of the dielectric substrate 130. In Type 3, one sub line (in FIG. 9, the sub line 107A of the directional coupler 105A) is disposed between the main line 106A and the main line 106B, while the other sub line (in FIG. 9, the sub line 107B of the directional coupler 105B) is disposed at a position opposite to that of the main line 106A with respect to the main line 106B.

Further, in Type 4, both of the two sub lines 107A and 107B are not disposed between the main line 106A and the main line 106B. In other words, between the sub line 107A and the sub line 107B, the two main lines 106A and 106B are arranged in parallel to each other with a distance that can ensure isolation.

In Type 3 and Type 4, at least one of the main lines 106A and 106B is disposed between the sub lines 107A and 107B, and the sub lines 107A and 107B are not disposed adjacent to and parallel to each other. Thus, isolation between the sub lines 107A and 107B is ensured.

In Type 5, the sub line 107A of the directional coupler 105A is disposed between the main line 106A and the main line 106B in the same layer as that of the main line 106A and the main line 106B. On the other hand, the sub line 107B of the directional coupler 105B is disposed in a layer separated from the main line 106B in the positive direction of the Z-axis. In the configuration of Type 5, since the sub line 107A and the sub line 107B are disposed in different layers, it is possible to ensure isolation between the sub line 107A and the sub line 107B.

Figure 10:
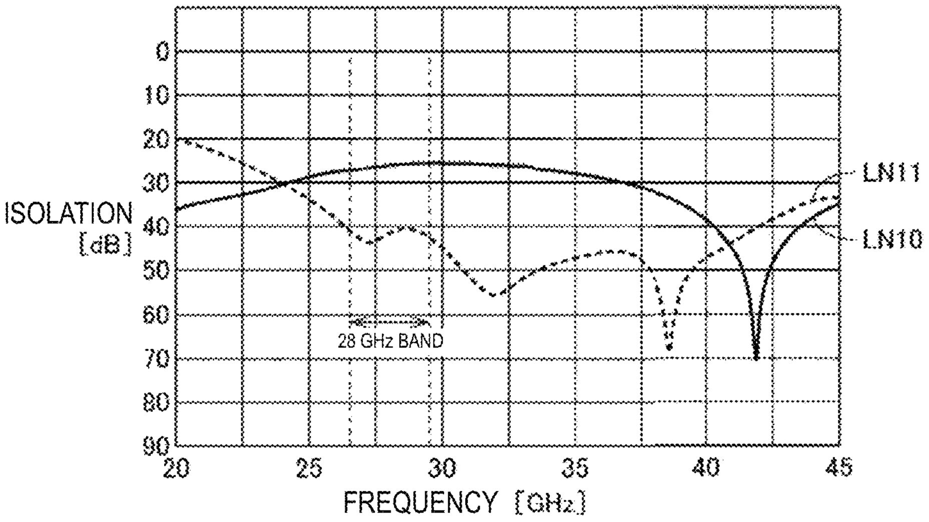
FIG. 10 is a diagram for explaining isolation between sub lines in a comparative example.
Figure 11:
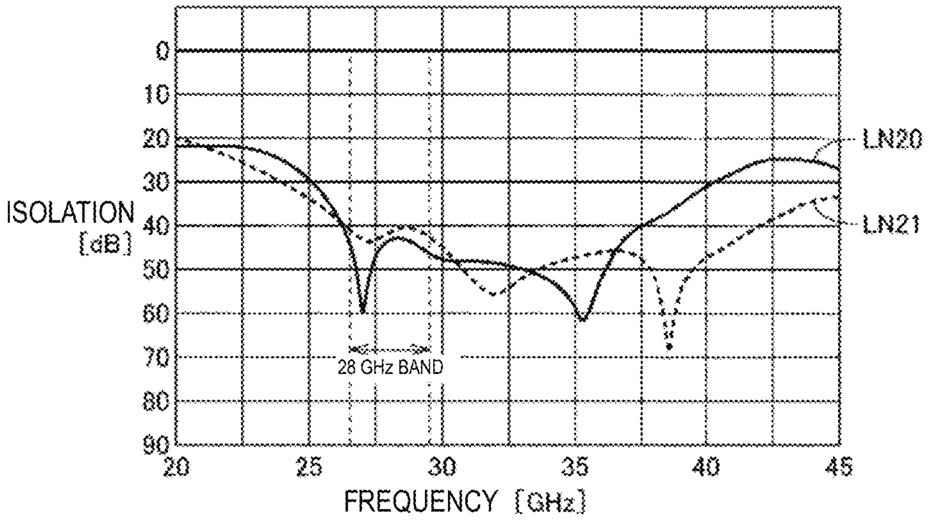
FIG. 11 is a diagram for explaining isolation between sub lines in a case of Type 1 in FIG. 9.
Figure 12:
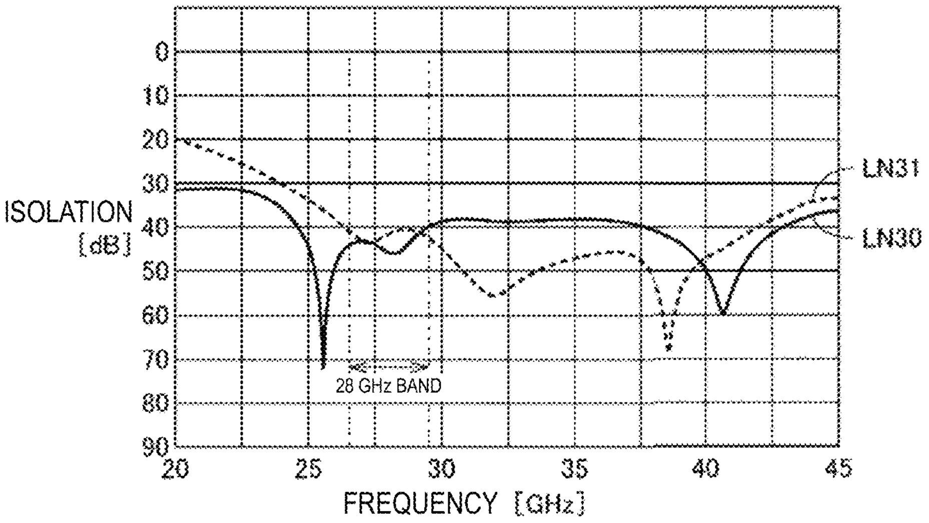
FIG. 12 is a diagram for explaining isolation between sub lines in a case of Type 5 in FIG. 9.

Next, isolation in the case of the arrangement of the main line and the sub line according to Embodiment 2 and isolation in the case of a comparative example will be described with reference to FIG. 10 to FIG. 12. FIG. 10 is a diagram illustrating isolation between the sub lines in the comparative example. In addition, FIG. 11 and FIG. 12 are diagrams illustrating isolation in examples of Type 1 and Type 5 in FIG. 9, respectively. Note that FIG. 10 to FIG. 12 are simulations in a case of a 28 GHz band being as a target, and isolation in the arrangement in the directional couplers according to Embodiment 1 is indicated by the broken lines (LN11, LN21, and LN31) for reference.

With reference to FIG. 10, in the reference example (the broken line LN11) of the arrangement of Embodiment 1, the isolation in the 28 GHz band being the target is larger than 30 dB, but in the case of the comparative example, the isolation (the solid line LN10) is smaller than 30 dB in the 28 GHz band.

On the other hand, in the case of Type 1 of FIG. 11 (the solid line LN20) and the case of Type 5 of FIG. 12 (the solid line LN30), the isolation in the 28 GHz band is larger than 30 dB, and the isolation substantially equal to that in Embodiment 1 is achieved.

Note that, in Type 2, since the sub lines are arranged in different layers from each other, it can be easily understood that higher isolation can be achieved than that in Type 1. Also, in Type 3 and Type 4, since the main line or the main lines are disposed between the two sub lines, it can be assumed that the isolation between the sub lines can be ensured.

As described above, even when the two directional couplers are caused to extend in the same direction, by disposing at least one of the sub lines at a position different from a position between the two main lines, isolation between the two sub lines can be ensured, and radio waves in the respective polarization directions can be appropriately detected.

Embodiment 3

In Embodiments 1 and 2, the antenna module being the dual polarization type and being capable of radiating radio waves in one frequency band in two different polarization directions has been described.

In Embodiment 3, a case of an antenna module being a dual band type and dual polarization type and being capable of radiating radio waves in two different frequency bands in different polarization directions will be described.

(Configuration of Communication Device)

Figure 13:
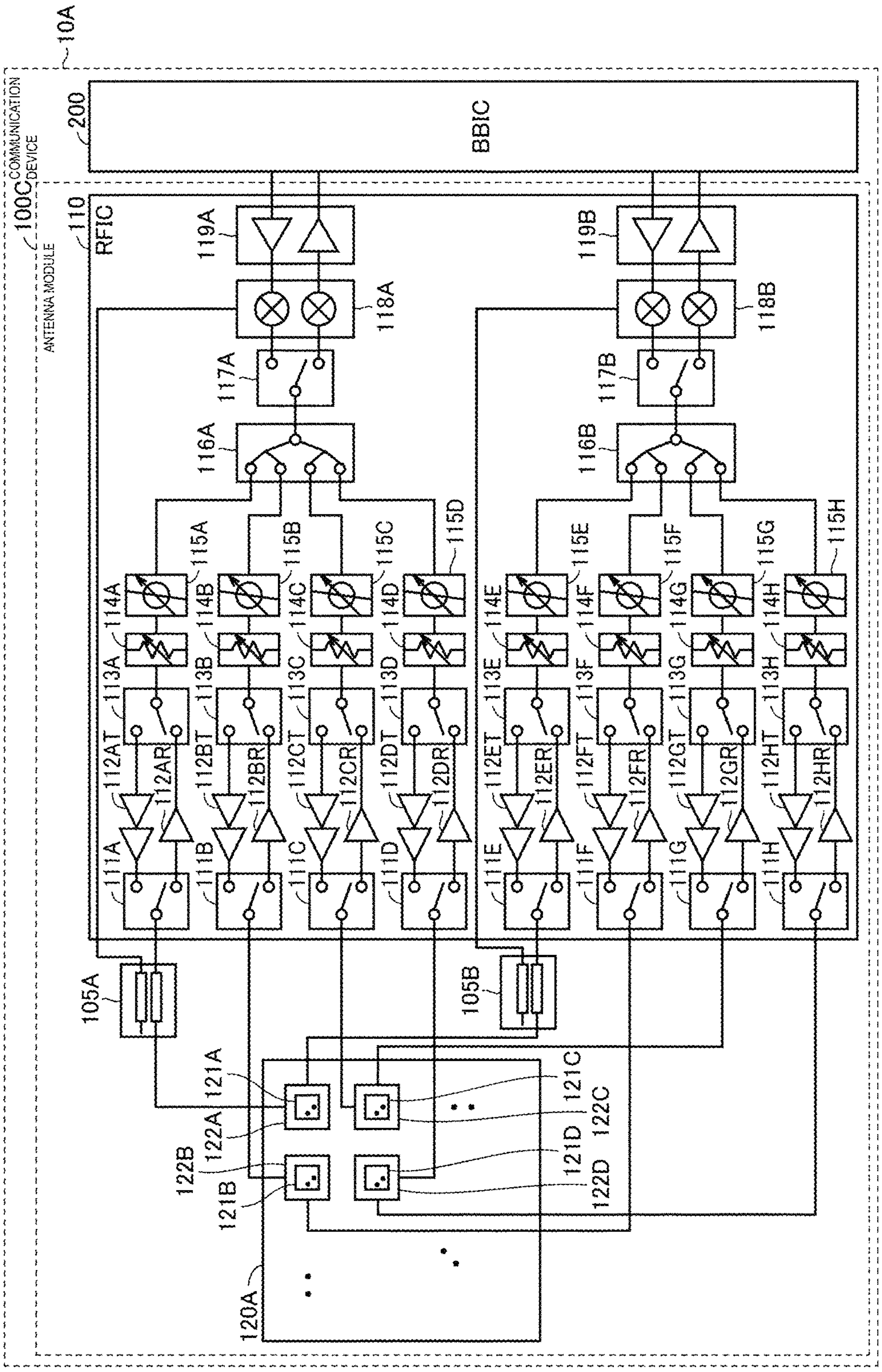
FIG. 13 is a block diagram of a communication device to which an antenna module according to Embodiment 3 is applied.

FIG. 13 is a block diagram of a communication device 10A to which an antenna module 100C according to Embodiment 3 is applied. With reference to FIG. 13, the communication device 10A includes the antenna module 100C and the BBIC 200. The antenna module 100C includes an antenna unit 120A, the RFIC 110, and the directional couplers 105 (105A, and 105B). Since the RFIC 110 and the directional couplers 105 are similar to those in FIG. 1 of Embodiment 1, detailed description thereof will not be repeated.

The antenna unit 120A includes, as radiation elements, the feeding elements 121 (121A to 121D) (first elements) and parasitic elements 122 (122A to 122D) (second elements). As in Embodiment 1, a radio frequency signal for a first polarized wave and a radio frequency signal for a second polarized wave are supplied from the RFIC 110 to each of the feeding elements 121.

To be more specific, radio frequency signals from the switches 111A and 111E are supplied to the feeding element 121A via the directional couplers 105A and 105B, respectively. Radio frequency signals from the switches 111B and 111F are supplied to the feeding element 121B. Radio frequency signals from the switches 111C and 111G are supplied to the feeding element 121C. Radio frequency signals from the switches 111D and 111H are supplied to the feeding element 121D.

(Configuration of Antenna Module)

Figure 14:
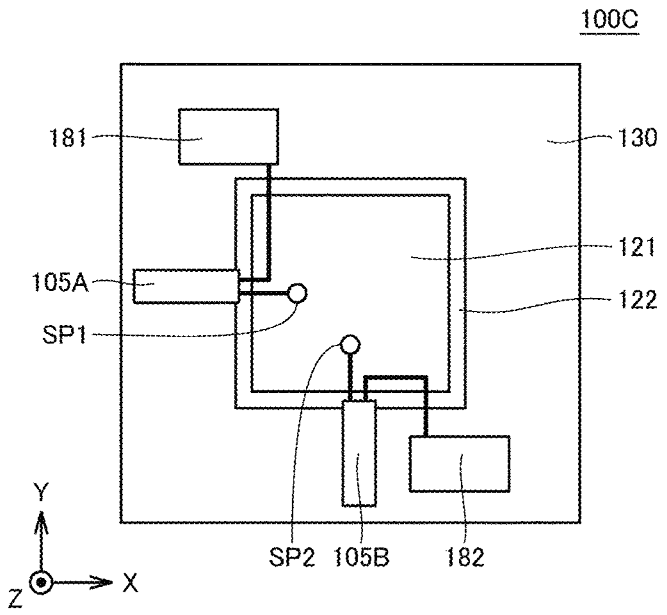
FIG. 14 is a plan view of the antenna module of FIG. 13.

A detailed configuration of the antenna module 100C according to Embodiment 3 will be described with reference to FIG. 14 and FIG. 15. FIG. 14 illustrates a plan view of the antenna module 100C, and FIG. 15 illustrates a side perspective view of the antenna module 100C.

Figure 15:
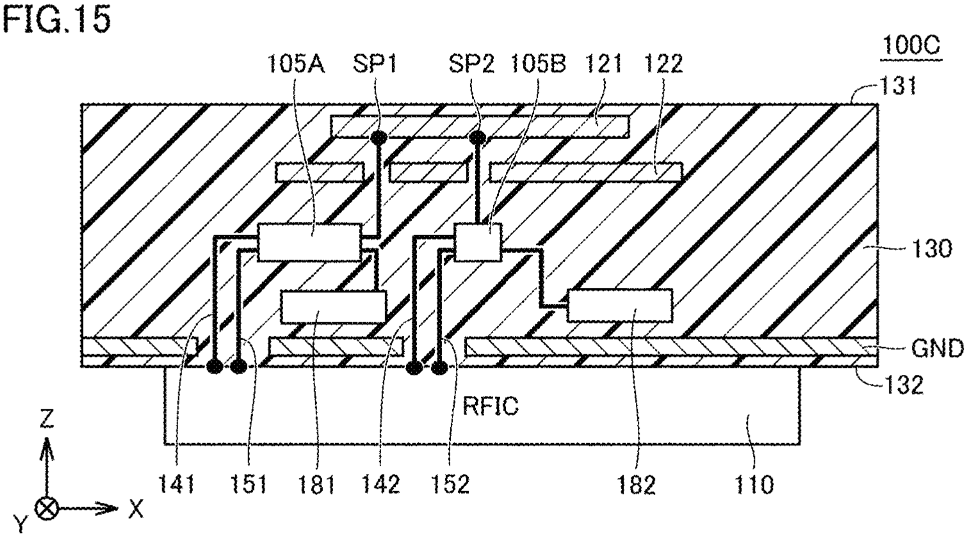
FIG. 15 is a side perspective view of the antenna module of FIG. 13.

With reference to FIG. 14 and FIG. 15, the antenna module 100C includes the dielectric substrate 130, the feeding wiring lines 141 and 142, the coupling lines 151 and 152, filter devices 181 and 182, and the ground electrode GND, in addition to the radiation elements (the feeding element 121 and the parasitic element 122), the RFIC 110, and the directional couplers 105A and 105B. Note that, in FIG. 14 and FIG. 15, elements identical to those of FIG. 4 and FIG. 5 of Embodiment 1 will not be described repeatedly.

The feeding element 121 is disposed on a surface or in an inner layer on the upper surface 131 side of the dielectric substrate 130. The parasitic element 122 is disposed in a layer between the feeding element 121 and the ground electrode GND disposed on the lower surface 132 side of the dielectric substrate 130 so as to face the feeding element 121.

The feeding element 121 and the parasitic element 122 are patch antennas each of which has a substantially square planar shape. A size of the parasitic element 122 is larger than a size of the feeding element 121, and a resonant frequency of the parasitic element 122 is lower than a resonant frequency of the feeding element 121.

The feeding wiring line 141 extends from the RFIC 110 via the directional coupler 105A and further passes through the parasitic element 122 to be connected to the feeding point SP1 of the feeding element 121. Further, the feeding wiring line 142 extends from the RFIC 110 via the directional coupler 105B and further passes through the parasitic element 122 to be connected to the feeding point SP2 of the feeding element 121.

With such a configuration, a radio frequency signal in a frequency band corresponding to the feeding element 121 is supplied from the RFIC 110 by using the feeding wiring line, whereby a radio wave is radiated from the feeding element 121. In addition, a radio frequency signal in a frequency band corresponding to the parasitic element 122 is supplied from the RFIC 110, whereby a radio wave is radiated from the parasitic element 122.

As illustrated in FIG. 14, the feeding point SP1 is arranged at a position offset from the center of the feeding element 121 in the negative direction of the X-axis, and the feeding point SP2 is arranged at a position offset from the center of the feeding element 121 in the negative direction of the Y-axis. Thus, a radio wave having a polarization direction in the X-axis direction is radiated by supplying a radio frequency signal to the feeding wiring line 141, and a radio wave having a polarization direction in the Y-axis direction is radiated by supplying a radio frequency signal to the feeding wiring line 142. That is, the antenna module 100C functions as an antenna module of a dual band type and a dual polarization type.

The directional couplers 105A and 105B are disposed in a layer between the parasitic element 122 and the ground electrode GND. As illustrated in FIG. 14, in plan view of the dielectric substrate 130 from the normal direction, the directional coupler 105A is disposed such that the main line and the sub line extend in the X-axis direction, and the directional coupler 105B is disposed such that the main line and the sub line extend in the Y-axis direction. With such arrangement of the directional couplers 105, isolation between the directional couplers is ensured.

In the antenna module 100C, the filter devices 181 and 182 are connected to the directional coupler 105A, and the filter device 182 is connected to the directional coupler 105B. The filter devices 181 and 182 are provided to detect signals in two frequency bands in the directional coupler 105. Although FIG. 14 and FIG. 15 illustrate an example in which the filter devices 181 and 182 are disposed in a layer between a layer in which the directional couplers 105A and 105B are formed and the ground electrode GND, at positions that do not overlap the radiation elements in plan view, the positions at which the filter devices 181 and 182 are formed are not limited thereto.

Figure 16:
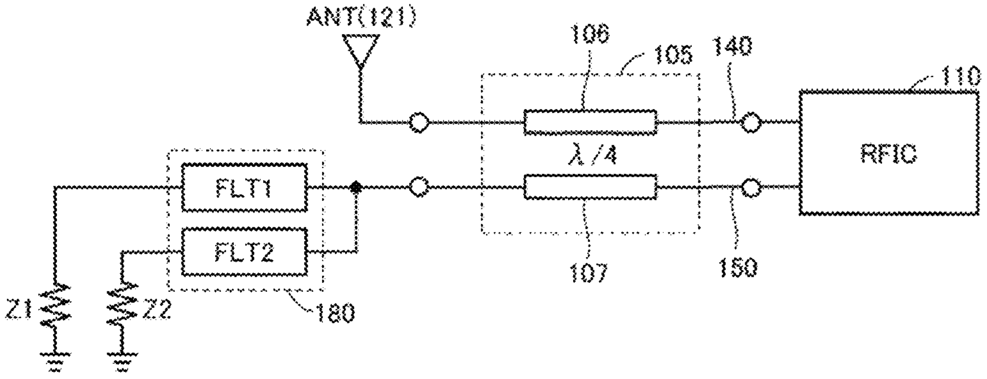
FIG. 16 is a diagram for explaining a configuration of filters in FIG. 13.

FIG. 16 is a diagram for explaining the configuration of the filters in FIG. 13. Note that, in the following description, the filter devices 181 and 182 are also collectively referred to as a "filter device 180".

With reference to FIG. 16, the directional coupler 105 is configured to include the main line 106 formed on the feeding wiring line 140 and the sub line 107 formed on the coupling line 150, as described with reference to FIG. 2. One end of the sub line 107 is connected to the filter device 180 including a filter FLT1 (first filter) and a filter FLT2 (second filter). The filter FLT1 is connected to the ground potential with an impedance element Z1 interposed therebetween, and the filter FLT2 is connected to the ground potential with an impedance element Z2 interposed therebetween.

The filter FLT1 has frequency characteristics that allow a detection signal of a radio wave at a high band side radiated from the feeding element 121 to pass therethrough and that attenuate a detection signal of a radio wave at a low band side radiated from the parasitic element 122. On the other hand, the filter FLT2 has frequency characteristics that attenuate a detection signal of a radio wave at a high band side radiated from the feeding element 121 and that allow a detection signal of a radio wave at a low band side radiated from the parasitic element 122 to pass therethrough. It is desirable that the impedance elements Z1 and Z2 be set to such impedances that phases of signals that have passed through the filters FLT1 and FLT2 and phases of signals reflected by the ground ends are opposite to each other.

Instead of individually respectively providing the impedance elements Z1 and Z2 for the two filters FLT1 and FLT2, a switch may be provided in parallel to one impedance element, and an impedance may be adjusted according to the corresponding frequency band by switching the switch. In this case, the switch may be formed in the RFIC 110.

By connecting such a filter device to a sub line of a directional coupler corresponding to each polarization direction, signals in a plurality of frequency bands can be demultiplexed and detected by using one sub line. Thus, even in the case of the antenna module being the dual band type and dual polarization type, it is possible to appropriately detect a radio wave in each polarization direction in each band.

Note that, in Embodiment 3 as well, the two directional couplers may have the same extending directions as those in Embodiment 2.

Modification 2

In Embodiment 3, the example of the antenna module of the dual band type in which one of the radiation elements is a parasitic element has been described.

In Modification 2, an antenna module of an individual feeding type and dual band type in which radio frequency signals are individually supplied to both radiation elements will be described.

Figure 17:
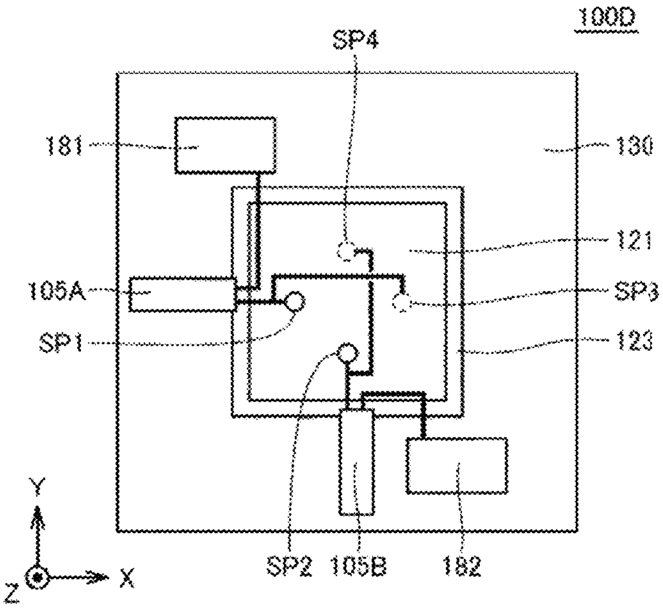
FIG. 17 is a plan view of an antenna module according to Modification 2.
Figure 18:
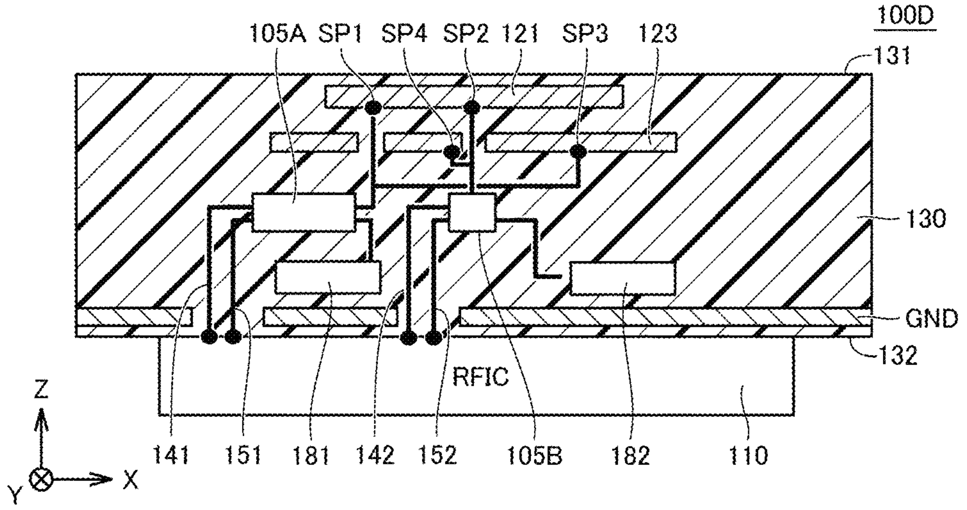
FIG. 18 is a side perspective view of the antenna module according to Modification 2.

FIG. 17 and FIG. 18 are respectively a plan view and a side perspective view of an antenna module 100D according to Modification 2. With reference to FIG. 17 and FIG. 18, the antenna module 100D includes two feeding elements 121 (first element) and 123 (second element) as radiation elements. Like the parasitic element 122 of Embodiment 2, the feeding element 123 is disposed in a layer between the feeding element 121 and the ground electrode GND so as to face the feeding element 121.

The feeding wiring line 141 passes through the feeding element 123 via the directional coupler 105A and is connected to the feeding point SP1 of the feeding element 121. Further, the feeding wiring line 141 is also connected to a feeding point SP3 of the feeding element 123 via the directional coupler 105A. On the other hand, the feeding wiring line 142 passes through the feeding element 123 via the directional coupler 105B and is connected to the feeding point SP2 of the feeding element 121, and is also connected to a feeding point SP4 of the feeding element 123 via the directional coupler 105B.

The feeding point SP3 of the feeding element 123 is disposed at a position offset from the center of the feeding element 123 in the positive direction of the X-axis. For this reason, a radio frequency signal corresponding to the feeding element 123 is supplied to the feeding point SP3 through the feeding wiring line 141, whereby a radio wave having a polarization direction in the X-axis direction is radiated from the feeding element 123. In addition, the feeding point SP4 of the feeding element 123 is disposed at a position offset from the center of the feeding element 123 in the positive direction of the Y-axis. Thus, a radio frequency signal corresponding to the feeding element 123 is supplied to the feeding point SP4 through the feeding wiring line 142, whereby a radio wave having a polarization direction in the Y-axis direction is radiated from the feeding element 123.

In this way, by switching frequencies of the radio frequency signals supplied to the feeding wiring line, radio waves in two different frequency bands can be radiated in two different polarization directions.

Also, in the configuration of Modification 2, the filter device 180, which has been described with reference to FIG. 16, is connected to each directional coupler 105. Thus, even when a frequency band of a radio wave to be radiated is changed, the radio wave in each polarization direction radiated from the radiation element can be detected.

Modification 3

In Embodiment 2 and Modification 2 described above, the configuration has been described in which radio waves in two frequency bands are radiated by switching a frequency band of a radio frequency signal to be supplied to one feeding wiring line.

In Modification 3, an antenna module of a dual band type and a dual polarization type having a configuration in which a radio frequency signal is supplied to each feeding point of two feeding elements by using an individual feeding wiring line will be described.

Figure 19:
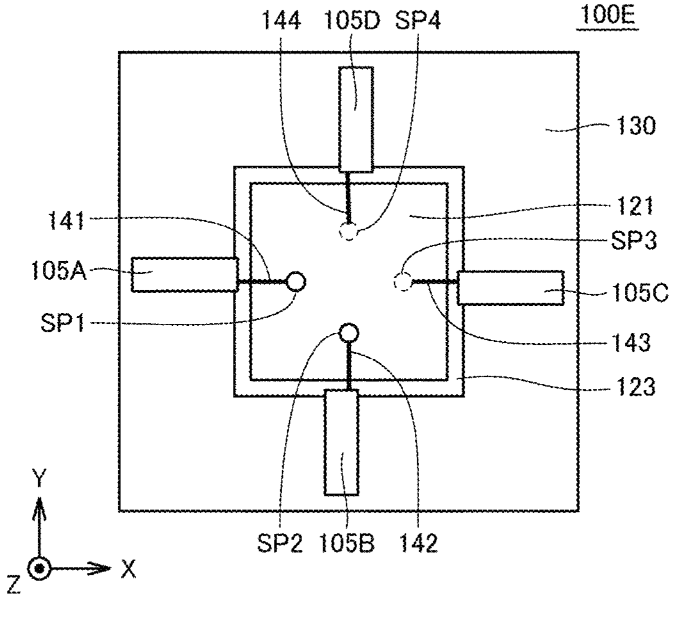
FIG. 19 is a plan view of an antenna module according to Modification 3.

FIG. 19 is a plan view of an antenna module 100E according to Modification 3. In the antenna module 100E, two feeding elements 121 and 123 are provided same as radiation elements as in Modification 2.

The feeding points SP1 and SP2 are disposed in the feeding element 121. A radio frequency signal is supplied to the feeding point SP1 through the feeding wiring line 141 via the directional coupler 105A. A radio frequency signal is supplied to the feeding point SP2 through the feeding wiring line 142 via the directional coupler 105B.

The feeding points SP3 and SP4 are disposed in the feeding element 123. A radio frequency signal is supplied to the feeding point SP3 through the feeding wiring line 143 via the directional coupler 105C. A radio frequency signal is supplied to the feeding point SP4 through the feeding wiring line 144 via the directional coupler 105D.

Each directional coupler has a configuration similar to that of FIG. 2, and can detect a radio frequency signal to be supplied to the corresponding feeding point. Thus, by adopting a configuration such as that of the antenna module 100E, it is possible to detect radio waves in the respective polarization directions for the respective frequency bands in the antenna module of individual feeding type in both dual band type and dual polarization type.

Embodiment 4

In Embodiment 3 and Modifications 2 and 3, the examples of the antenna module of the dual band type in which two radiation elements (a feeding element and a parasitic element) are stacked in the laminating direction (Z-axis direction) of the dielectric substrate have been described.

In Embodiment 4, an antenna module of an array type in which two radiation elements are arranged on a plane will be described.

Figure 20:
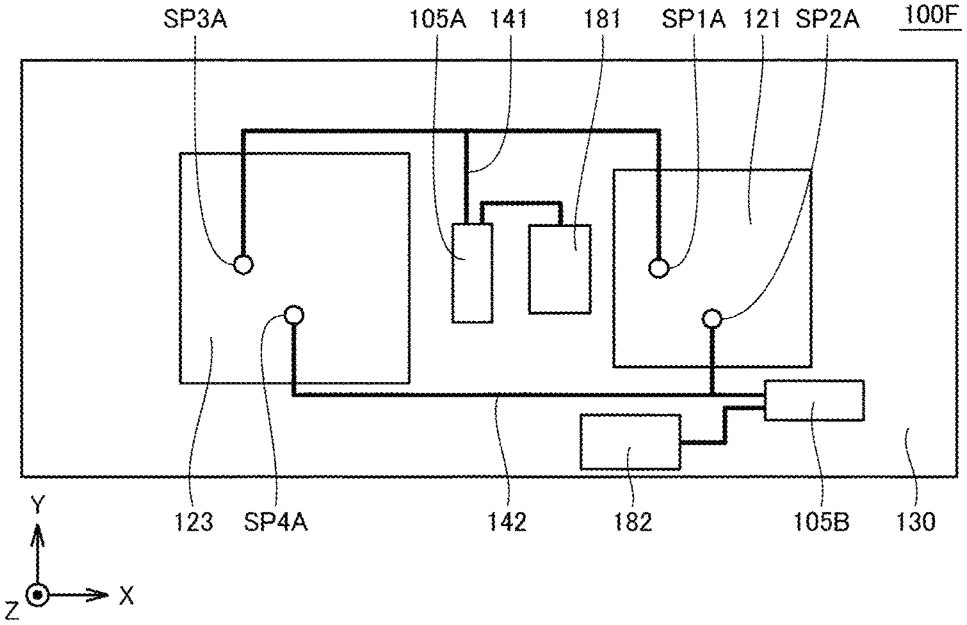
FIG. 20 is a plan view of an antenna module according to Embodiment 4.

FIG. 20 is a plan view of an antenna module 100F according to Embodiment 4. With reference to FIG. 20, in the antenna module 100F, in plan view of the dielectric substrate 130 from the normal direction, two feeding elements 121 (first element) and 123 (second element) are disposed adjacent to each other on the dielectric substrate 130. A size of the feeding element 121 is smaller than a size of the feeding element 123. That is, the feeding element 121 is a radiation element at a high band side, and the feeding element 123 is a radiation element at a low band side.

In the feeding element 121, a feeding point SP1A is disposed at a position offset from the center of the feeding element 121 in the X-axis direction, and a feeding point SP2A is disposed at a position offset from the center of the feeding element 121 in the Y-axis direction. Additionally, in the feeding element 123, a feeding point SP3A is disposed at a position offset from the center of the feeding element 123 in the X-axis direction, and a feeding point SP4A is disposed at a position offset from the center of the feeding element 123 in the Y-axis direction.

Radio frequency signals are supplied to the feeding point SP1A of the feeding element 121 and the feeding point SP3A of the feeding element 123 through the feeding wiring line 141 via the directional coupler 105A. Further, radio frequency signals are supplied to the feeding point SP2A of the feeding element 121 and the feeding point SP4A of the feeding element 123 through the feeding wiring line 142 via the directional coupler 105B. Then, the filter device 181 is connected to the directional coupler 105A, and the filter device 182 is connected to the directional coupler 105B.

Accordingly, when radio frequency signals are supplied to the feeding point SP1A of the feeding element 121 and the feeding point SP3A of the feeding element 123, a radio wave having a polarization direction in the X-axis direction is radiated from the corresponding feeding element. When radio frequency signals are supplied to the feeding point SP2A of the feeding element 121 and the feeding point SP4A of the feeding element 123, a radio wave having a polarization direction in the Y-axis direction is radiated from the corresponding feeding element.

Then, the directional couplers 105A and 105B and the filter devices 181 and 182 connected thereto can detect radio waves in the respective polarization directions in the respective frequency bands.

Modification 4

In Modification 4, a case of an array antenna being a single band type will be described.

Figure 21:
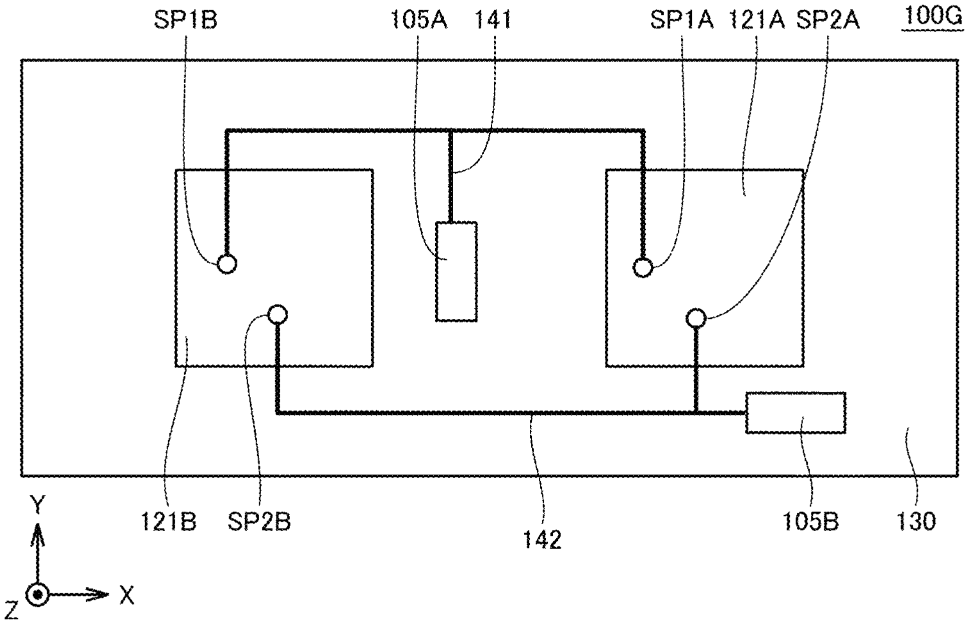
FIG. 21 is a plan view of a first example of an antenna module according to Modification 4.

FIG. 21 is a plan view of a first example of an antenna module 100G according to Modification 4. With reference to FIG. 21, in the antenna module 100G, in plan view of the dielectric substrate 130 from the normal direction, two feeding elements 121A (first element) and 121B (second element) having the same size are arranged adjacent to each other on the dielectric substrate 130.

In the feeding element 121A, the feeding point SP1A is arranged at a position offset from the center of the feeding element 121A in the X-axis direction, and the feeding point SP2A is arranged at a position offset from the center of the feeding element 121A in the Y-axis direction. Further, in the feeding element 121B, the feeding point SP1B is arranged at a position offset from the center of the feeding element 121B in the X-axis direction, and the feeding point SP2B is arranged at a position offset from the center of the feeding element 121B in the Y-axis direction.

Radio frequency signals are supplied to the feeding point SP1A of the feeding element 121A and the feeding point SP1B of the feeding element 121B through the feeding wiring line 141 via the directional coupler 105A. In addition, radio frequency signals are supplied to the feeding point SP2A of the feeding element 121A and the feeding point SP2B of the feeding element 121B through the feeding wiring line 142 via the directional coupler 105B.

In such a configuration, radio waves in the same frequency band are radiated from the feeding elements 121A and 121B. Thus, in each of the directional couplers 105A and 105B, a signal corresponding to added power to be supplied to the two feeding elements 121A and 121B is detected. As in the antenna module 100G of FIG. 21, by sharing a directional coupler by a plurality of feeding elements in an array antenna, the number of directional couplers can be reduced, and thus, the antenna module can be miniaturized.

Note that although FIG. 21 illustrates the case where there are two feeding elements, the number of feeding elements may be three or more, or three or more feeding elements may be configured to share one directional coupler. Further, for example, as in an antenna module 100H of FIG. 22, a configuration in which feeding elements are two-dimensionally arranged may be employed.

Figure 22:
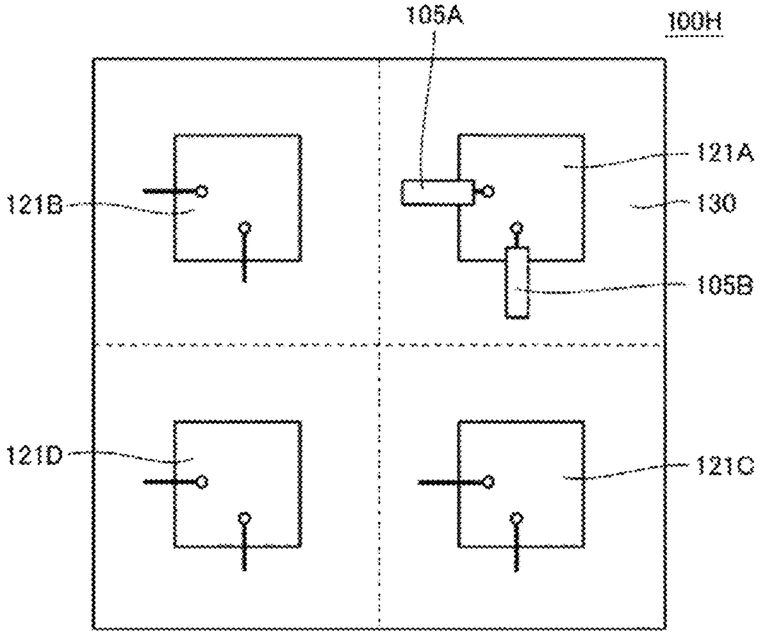
FIG. 22 is a plan view of a second example of the antenna module according to Modification 4.

Alternatively, in a case of an array antenna including a large number of feeding elements, a plurality of feeding elements may be divided into a plurality of groups, and a directional coupler may be provided by using one feeding element of the group as a representative (FIG. 22).

In Embodiments 1 to 4 described above, the example in which the directional coupler is applied to the antenna module of the dual polarization type has been described. In the following reference example, an example in which a directional coupler is applied to an antenna module of a single polarization type that radiates a radio wave in one polarization direction from a radiation element will be described.

Reference Example 1

Figure 23:
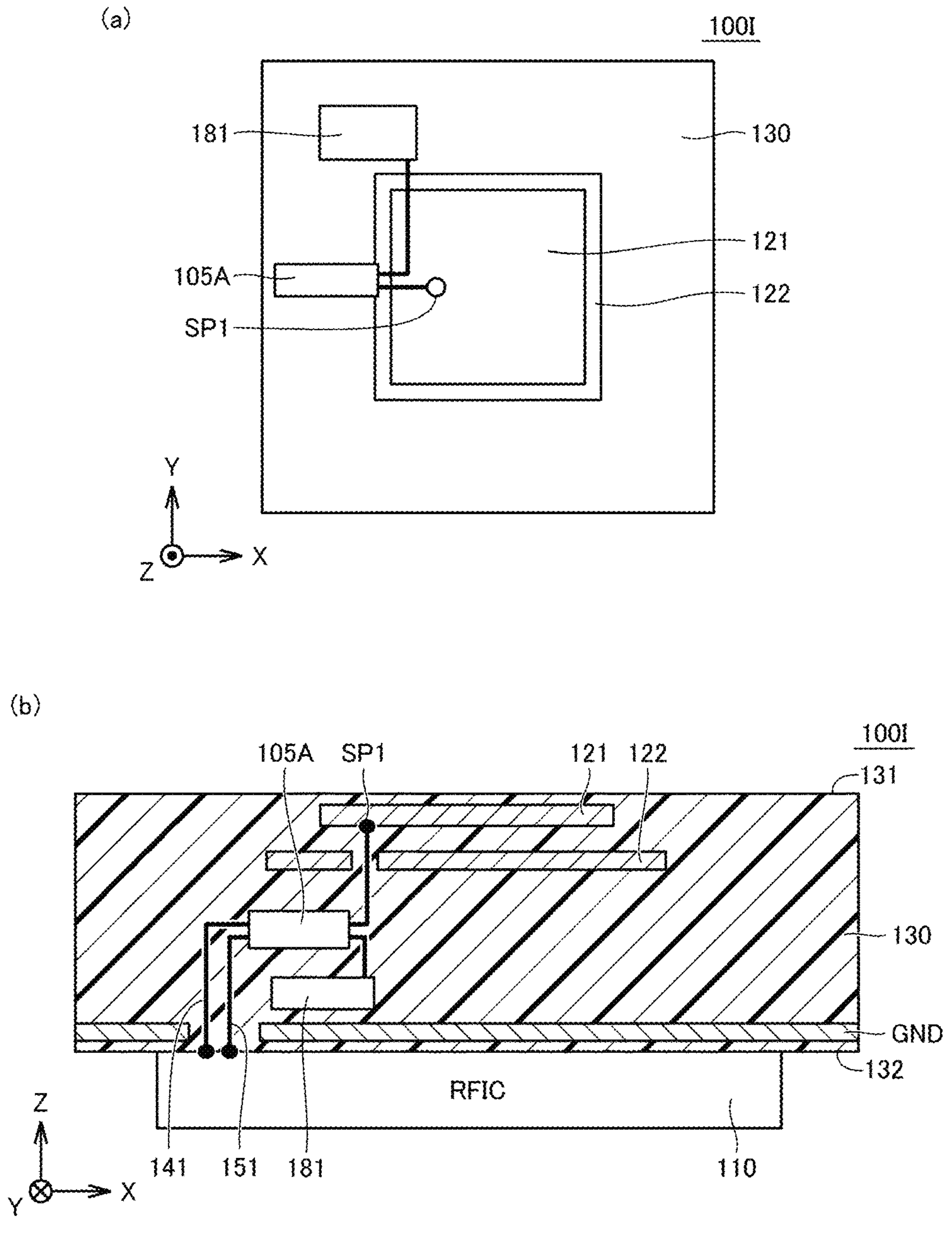
FIG. 23 is a plan view and a side perspective view of an antenna module according to Reference Example 1.

FIG. 23 is a plan view (FIG. 23(*a*)) and a side perspective view (FIG. 23(*b*)) of an antenna module 100I of Reference Example 1. As in the antenna module 100C of Embodiment 3, the antenna module 100I is an antenna module of a dual band type including the feeding element 121 and the parasitic element 122 as radiation elements.

In FIG. 23, a configuration is illustrated in which elements related to a second polarization direction in the antenna module 100C illustrated in FIG. 14 and FIG. 15 are removed. That is, only the feeding point SP1 is disposed in the feeding element 121, and the feeding wiring line 141 via the directional coupler 105A from the RFIC 110 passes through the parasitic element 122 to be connected to the feeding point SP1. Then, the filter device 181 illustrated in FIG. 16 is connected to the sub line of the directional coupler 105A.

With such a configuration, it is possible to detect a radio wave in the antenna module of the single polarization type and dual band type.

Reference Example 2

Figure 24:
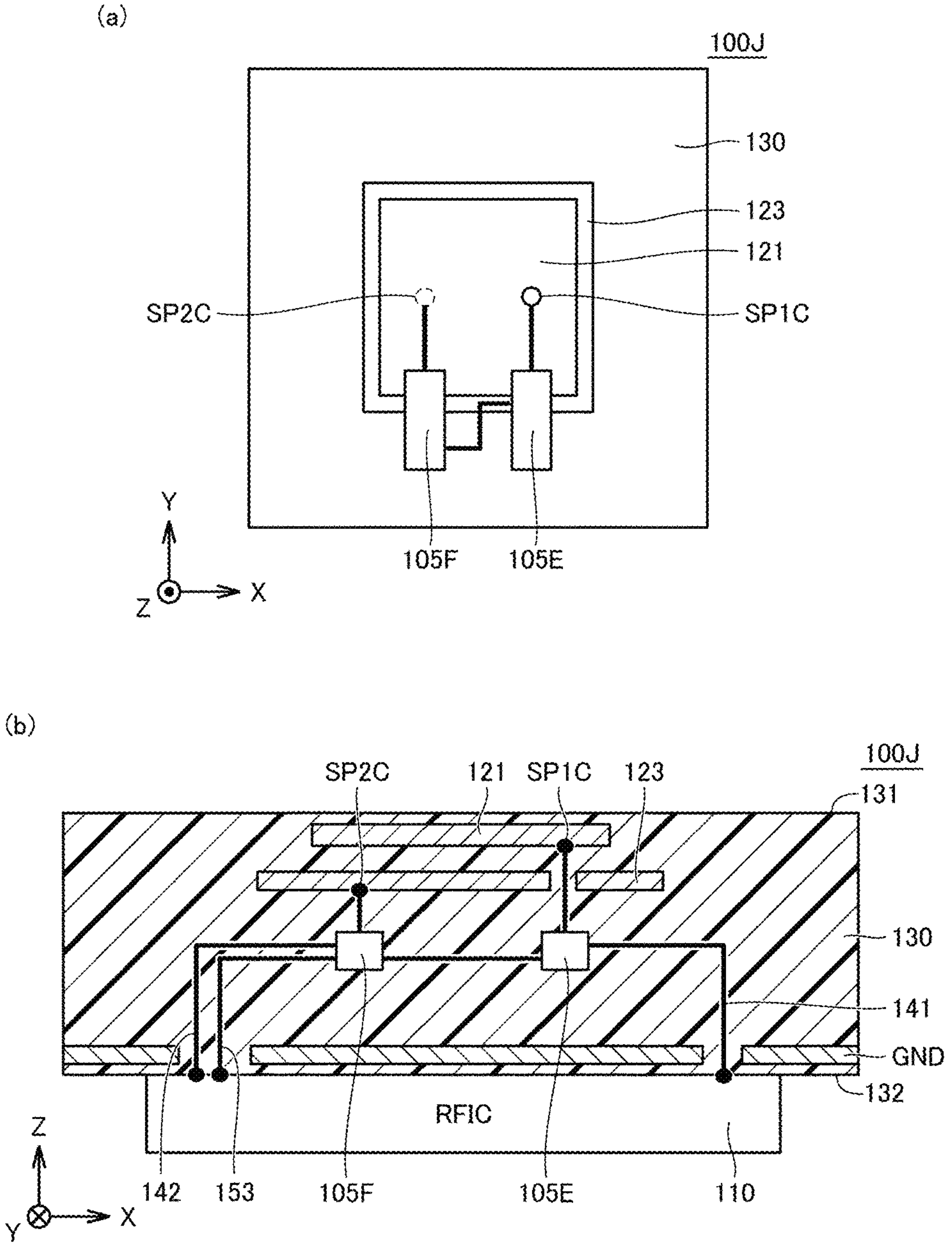
FIG. 24 is a plan view and a side perspective view of an antenna module according to Reference Example 2.

In Reference Example 2, a case of an antenna module being an individual feeding type and dual band type will be described. FIG. 24 represents a plan view (FIG. 24(*a*)) and a side perspective view (FIG. 24(*b*)) of an antenna module 100J according to Reference Example 2.

With reference to FIG. 24, the antenna module 100J includes the feeding element 121 and the feeding element 123 as radiation elements. The feeding element 123 is disposed in a layer between the feeding element 121 and the ground electrode GND.

The feeding element 121 is disposed with a feeding point SP1C. The feeding wiring line 141 via a directional coupler 105E passes through the feeding element 123 to be connected to the feeding point SP1C. Further, the feeding element 123 is provided with a feeding point SP2C. The feeding wiring line 142 via a directional coupler 105F is connected to the feeding point SP2C. Each of the feeding points SP1C and SP2C is disposed at a position offset in the X-axis direction from the center of the corresponding feeding element. Thus, a radio wave having a polarization direction in the X-axis direction is radiated from each of the feeding elements 121 and 123.

Figure 25:
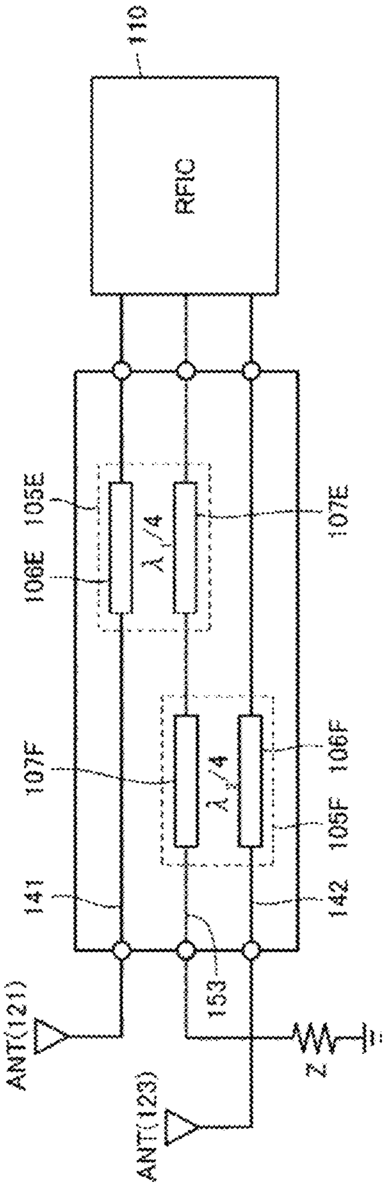
FIG. 25 is a diagram for explaining a configuration of directional couplers in the antenna module according to Reference Example 2.

Note that the directional coupler 105E and the directional coupler 105F in the antenna module 100J have a configuration in which the sub lines are coupled to each other. FIG. 25 is a diagram for explaining a configuration of directional couplers in the antenna module 100J. With reference to FIG. 25, a radio frequency signal is supplied to the feeding element 121 from the RFIC 110 with a main line 106E of the directional coupler 105E interposed therebetween through the feeding wiring line 141. In addition, a radio frequency signal is supplied to the feeding element 123 from the RFIC 110 with a main line 106F of the directional coupler 105F interposed therebetween through the feeding wiring line 142. One end of the sub line 107E of the directional coupler 105E is connected to the RFIC 110, and the other end of the sub line 107E is connected to one end of the sub line 107F of the directional coupler 105F. The other end of the sub line 107F is connected to the ground potential with an impedance element Z interposed therebetween.

At this time, when a wave length of a radio wave to be radiated from the feeding element 121 is defined as $\lambda_1$, and a wave length of a radio wave to be radiated from the feeding element 123 is defined as $\lambda_2$, lengths of the main line 106E and the sub line 107E of the directional coupler 105E are set to $\lambda_1/4$, and lengths of the main line 106F and the sub line 107F of the directional coupler 105F are set to $\lambda_2/4$. By appropriately setting a length of the coupling line 153 connecting the sub line 107E and the sub line 107F and an impedance of the impedance element Z, a signal in the corresponding frequency band can be detected by each directional coupler.

Embodiment 5

In recent years, portable terminals such as smartphones are becoming thinner and becoming larger in screen size. As the screen size increases, it becomes difficult to arrange an antenna on a main face side of a main body of a device, and thus, a method of arranging the antenna on a side face of a housing has been studied.

However, in the case where the antenna is disposed on the side face of the housing, since the size of a dielectric substrate to be disposed on the side face is limited, there is a possibility that a circuit such as a directional coupler cannot be disposed in the dielectric substrate. Thus, in Embodiment 5, a method of detecting a radio wave to be radiated from a radiation element by arranging a directional coupler in a connection portion connecting a substrate on a main face side of a housing and a substrate on a side face side on which the radiation element is arranged will be described.

Figure 26:
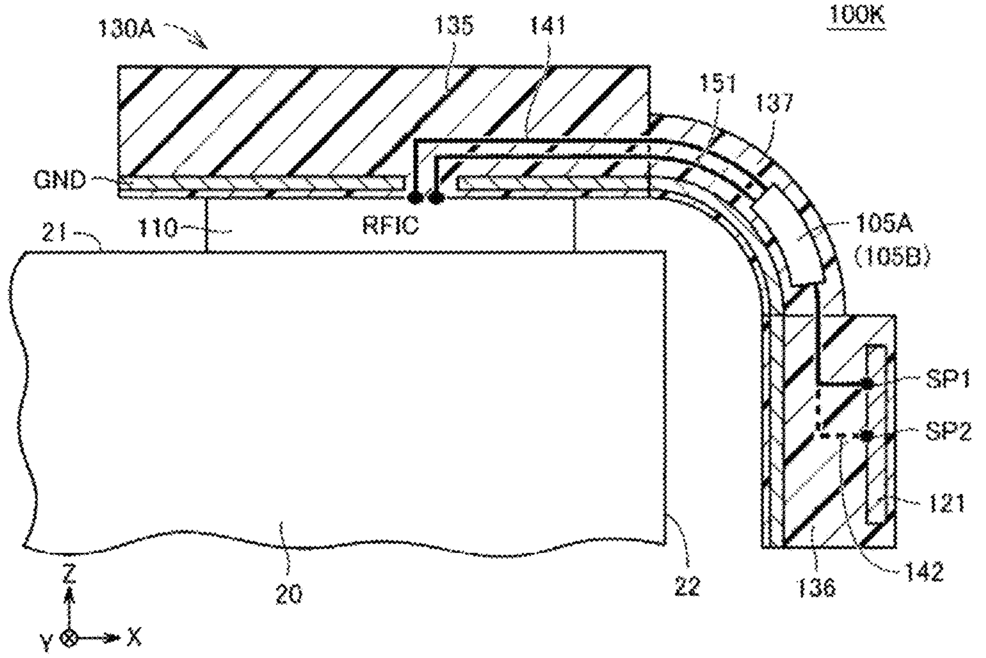
FIG. 26 is a side perspective view of an antenna module according to Embodiment 5.

FIG. 26 is a side perspective view of an antenna module 100K according to Embodiment 5. FIG. 26 illustrates a state in which the antenna module 100K is mounted on a mounting substrate 20. Note that, in FIG. 26, a first surface 21 of the mounting substrate 20 faces a main face (that is, a face on which a screen is disposed) of a housing of a device, and a second surface 22 faces a side face of the housing.

With reference to FIG. 26, a dielectric substrate 130A of the antenna module 100K includes a flat portion 135 (first portion), a flat portion 136 (second portion), and a bent portion 137 (third portion). The flat portion 135 is mounted on the first surface 21 of the mounting substrate 20 with the RFIC 110 interposed therebetween. The flat portion 136 faces the second surface 22 of the mounting substrate 20, and is disposed with the feeding element 121. That is, a normal direction (Z-axis direction) of the flat portion 135 is different from a normal direction (X-axis direction) of the flat portion 136. When a radio frequency signal is supplied from the RFIC 110 to the feeding element 121, a radio wave is radiated in the X-axis direction.

The flat portion 135 and the flat portion 136 are connected by using the bent portion 137. The bent portion 137 is, for example, a flexible substrate and is formed to be thinner than the flat portions 135 and 136 so as to be easily bent.

The ground electrode GND is formed from the flat portion 135 through the bent portion 137 to the flat portion 136. Further, the feeding wiring line 141 and the feeding wiring line 142 from the RFIC 110 extend from the flat portion 135 to the flat portion 136 through the bent portion 137, and are connected to the feeding points SP1 and SP2 of the feeding element 121, respectively. The directional coupler 105A is disposed on the feeding wiring line 141, and the sub line of the directional coupler 105A is connected to the RFIC 110 by using the coupling line 151. Note that although not illustrated in the figure, the directional coupler 105B is also disposed on the feeding wiring line 142.

Since the directional coupler is provided to monitor a state of radio waves to be radiated from the radiation element, it is preferable to detect a signal at a position as close to the radiation end as possible. However, as in the antenna module 100K, the flat portion 136 in which the radiation element (feeding element 121) is disposed is disposed to face the side face of the housing, and thus, the size thereof may be limited. In this case, there is a possibility that the directional coupler 105 cannot be disposed in the flat portion 136 or that the increase in the thickness of the dielectric substrate inhibits the reduction in size and height.

In the antenna module 100K, at least a part of the directional coupler is formed in the bent portion 137. Thus, the directional coupler can be disposed at a position as close to the radiation element as possible, and the antenna module can be reduced in size and height.

Modification 5

Although the case where the dielectric substrate has a bent shape has been described in Embodiment 5, a thin portion of the dielectric substrate is not necessarily bent.

Figure 27:
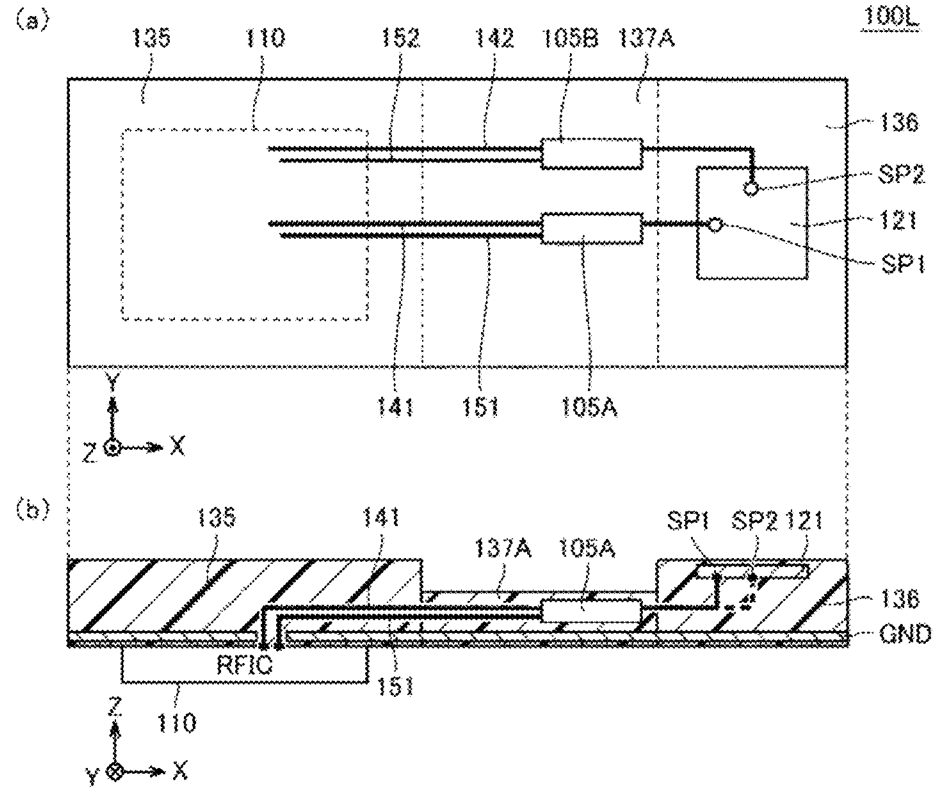
FIG. 27 is a plan view and a side perspective view of an antenna module according to Modification 5.

FIG. 27 represents a plan view (FIG. 27(*a*)) and a side perspective view (FIG. 27(*b*)) of an antenna module 100L according to Modification 5. In the antenna module 100L, a connection portion 137A corresponding to the bent portion 137 in the antenna module 100K according to Embodiment 3 is also flat. The connection portion 137A is formed to be thinner than the flat portions 135 and 136.

Also, in the antenna module 100L, when the size of the flat portion 136 is limited, at least a part of each of the directional couplers 105A and 105B is disposed in the connection portion 137A being thin as illustrated in FIG. 27. Thus, the directional coupler can be disposed at a position as close to the radiation element as possible, and the antenna module can be reduced in size and height.

In Modification 5, the "flat portion 135" and the "flat portion 136" correspond to the "first portion" and the "second portion" of the present disclosure, and the "connection portion 137A" corresponds to the "third portion" of the present disclosure.

Other Modifications

In the above-described embodiments and modifications, the radiation element is a patch antenna having a flat shape, but the radiation element is not limited to a patch antenna.

Figure 28:
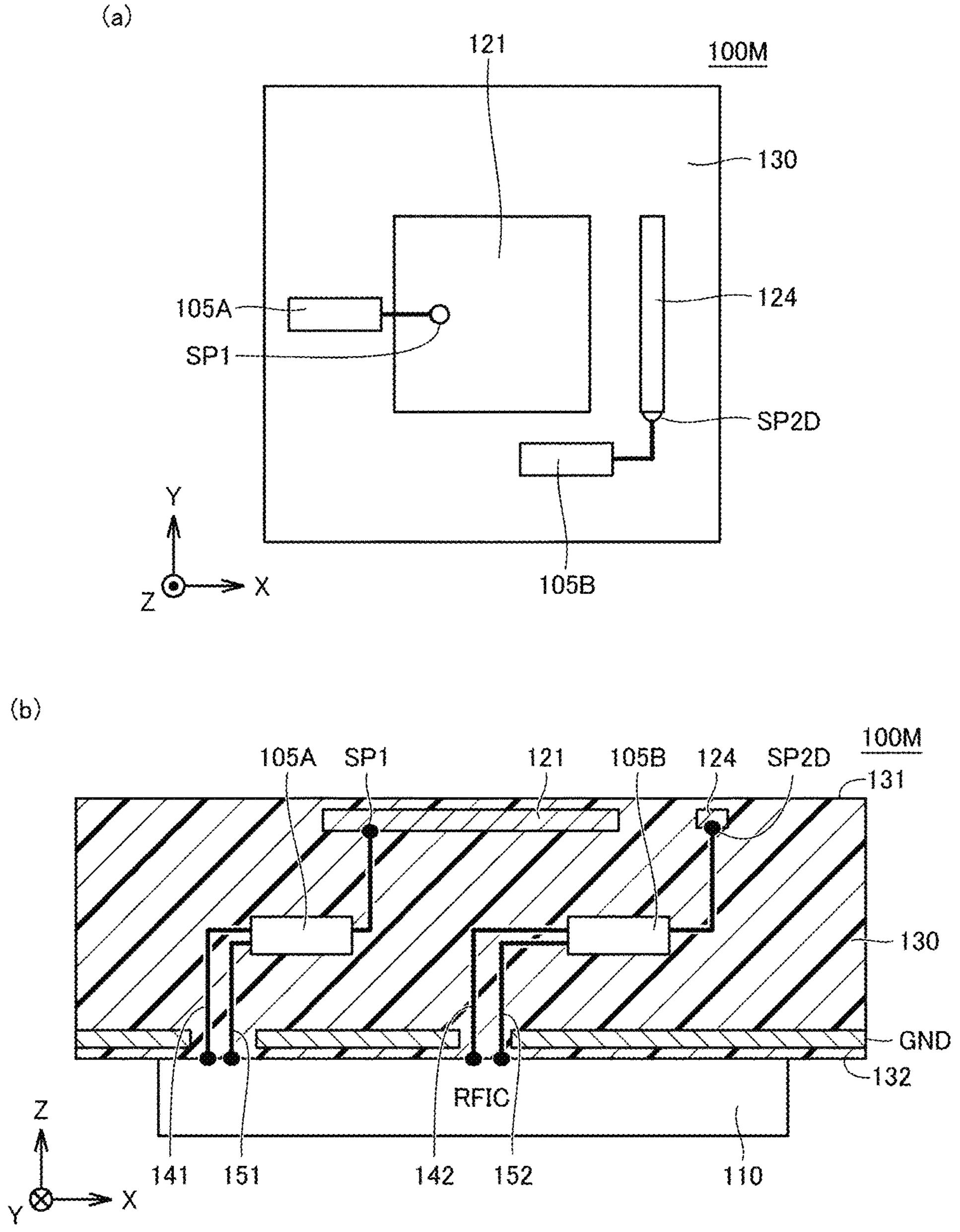
FIG. 28 is a plan view and a side perspective view of an antenna module according to Modification 6.
Figure 29:
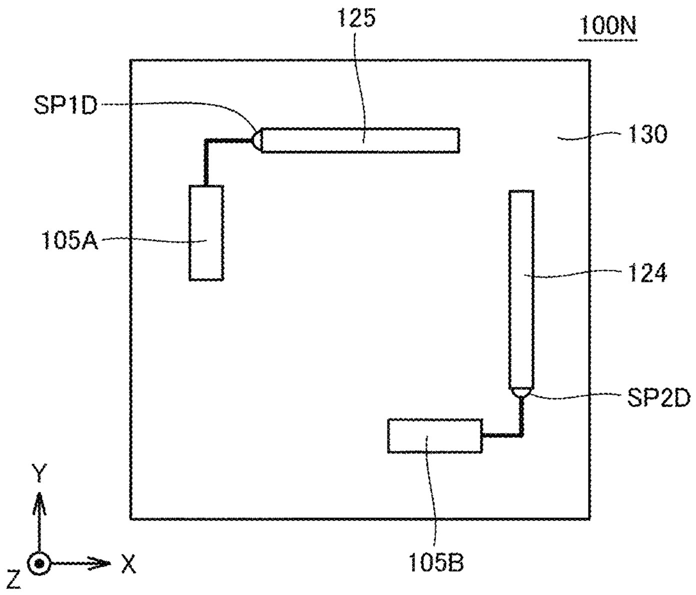
FIG. 29 is a plan view and a side perspective view of an antenna module according to Modification 7.
Figure 29:
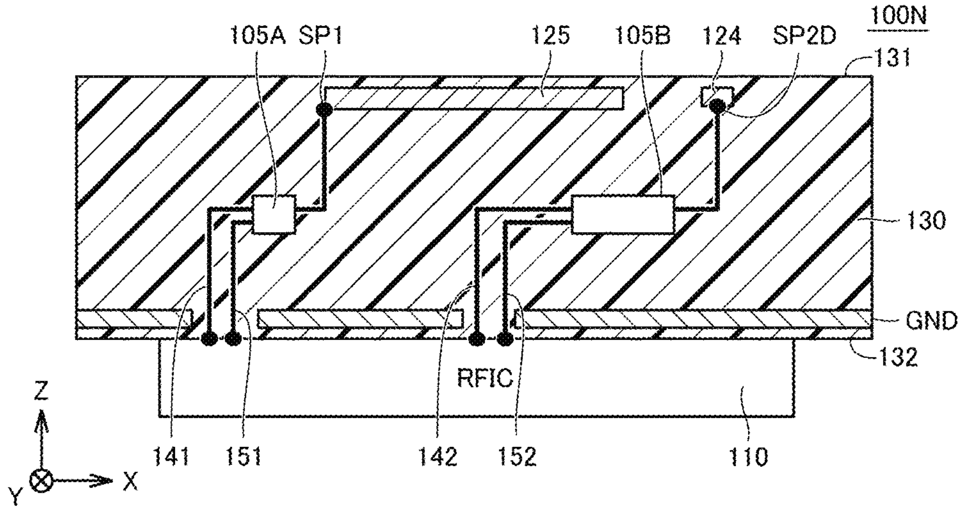

For example, as in an antenna module 100M according to Modification 6 illustrated in FIG. 28 or an antenna module 100N according to Modification 7 illustrated in FIG. 29, at least a part of a radiation element may be formed of a linear antenna such as a monopole antenna or a dipole antenna. Alternatively, as in an antenna module 100P illustrated in FIG. 31, a radiation element may be formed as a slot antenna.

Modification 6

FIG. 28 represents a plan view (FIG. 28(*a*)) and a side perspective view (FIG. 28(*b*)) of an antenna module 100M according to Modification 6. The antenna module 100M includes, as radiation elements, the feeding element 121 formed as a patch antenna having a planar shape and a feeding element 124 formed as a monopole antenna.

In the feeding element 121 of the patch antenna, the feeding point SP1 is disposed at a position offset from the center of the feeding element 121 in the negative direction of the X-axis. Thus, by supplying a radio frequency signal to the feeding wiring line 141, a radio wave having a polarization direction in the X-axis direction is radiated from the feeding element 121.

On the other hand, the feeding element 124 being the monopole antenna is disposed so as to extend in a direction along the Y-axis in the inner layer of the dielectric substrate 130, and a radio frequency signal is supplied to a feeding point SP2D at an end portion of the feeding element 124 through the feeding wiring line 142. In plan view of the antenna module 100M, an opening is formed in a portion of the ground electrode GND overlapping the feeding element 124. With this configuration, a radio wave having a polarization direction in the Y-axis direction is radiated from the feeding element 124.

Note that the feeding element 124 may be formed on the upper surface 131 or the lower surface 132 of the dielectric substrate 130. Further, by adjusting a length of the feeding element 124, it is possible to adjust a frequency band of a radio wave to be radiated from the feeding element 124.

Additionally, the directional coupler 105A is formed on the feeding wiring line 141 that supplies a radio frequency signal to the feeding element 121, and the directional coupler 105B is formed on the feeding wiring line 142 that supplies a radio frequency signal to the feeding element 124. This makes it possible to detect the radio frequency signals to be supplied to the feeding element 121 and the feeding element 124. Note that, in the example of FIG. 28, the directional coupler 105A and the directional coupler 105B are disposed such that the main lines and the sub lines extend in the X-axis direction, but isolation between the sub lines can be ensured by disposing the main lines and the sub lines as described in Embodiment 2.

Modification 7

FIG. 29 is a plan view (FIG. 29(*a*)) and a side perspective view (FIG. 29(*b*)) of an antenna module 100N according to Modification 7. The antenna module 100N includes, as radiation elements, feeding elements 124 and 125 formed as monopole antennas.

As with the antenna module 100M of FIG. 28, the feeding element 124 is disposed in the inner layer of the dielectric substrate 130 so as to extend in a direction along the Y-axis. When a radio frequency signal is supplied to the feeding point SP2D at an end portion of the feeding element 124 through the feeding wiring line 142, a radio wave having a polarization direction in the Y-axis direction is radiated from the feeding element 124.

On the other hand, the feeding element 125 is disposed in the inner layer of the dielectric substrate 130 so as to extend in a direction along the X-axis. A radio frequency signal is supplied to the feeding point SP1D at an end portion of the feeding element 125 through the feeding wiring line 141, whereby a radio wave having a polarization direction in the X-axis direction is radiated from the feeding element 125.

The directional coupler 105A is formed on the feeding wiring line 141, and the directional coupler 105B is formed on the feeding wiring line 142. This makes it possible to detect a radio frequency signal supplied to each feeding element. Further, the directional coupler 105A is disposed so as to extend in a direction along the Y-axis, and the directional coupler 105B is disposed so as to extend in a direction along the X-axis. Thus, isolation between the sub line of the directional coupler 105A and the sub line of the directional coupler 105B can be ensured.

Also, in the antenna module 100N, an opening is formed in a portion of the ground electrode GND overlapping each of the feeding elements 124 and 125 in plan view of the antenna module 100N.

Note that, in Modification 6 and Modification 7, the example in which the feeding elements 124 and 125 are monopole antennas has been described, but the feeding elements 124 and 125 may be dipole antennas.

Modification 8

In the antenna module described above, the feeding wiring line is configured to be directly connected to the feeding point disposed in each feeding element, but transmission of a radio frequency signal to the feeding element is not necessarily performed by directly connecting the feeding wiring line.

Figure 30:
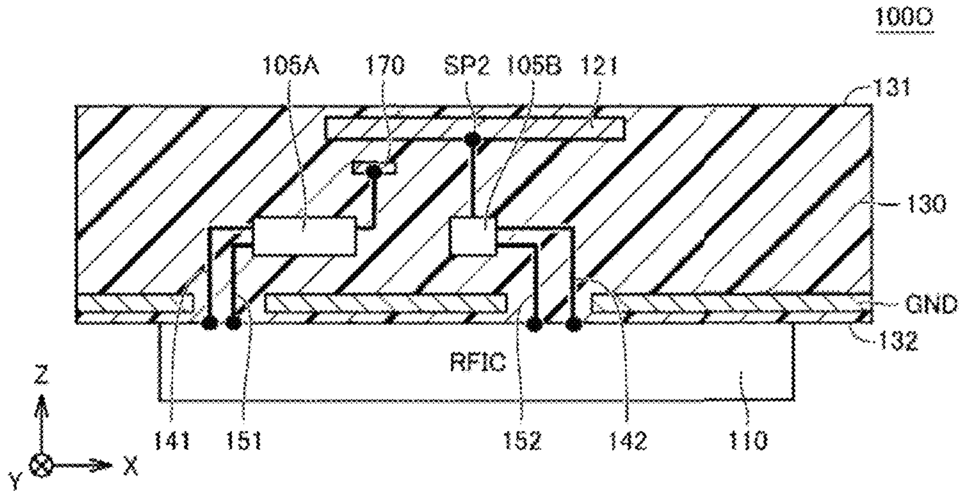
FIG. 30 is a side perspective view of an antenna module according to Modification 8.

For example, as in an antenna module 100O of Modification 8 illustrated in FIG. 30, for at least some of the feeding elements, the feeding wiring line may be connected to an electrode 170 configured to form a capacitor with the feeding element, and a radio frequency signal may be transmitted to the feeding element by using capacitive coupling between the electrode 170 and the feeding element. Note that the capacitor to be formed may be a chip component.

Note that, in this case, the "electrode 170" corresponds to the "feeding section" of the present disclosure.

Modification 9

Figure 31:
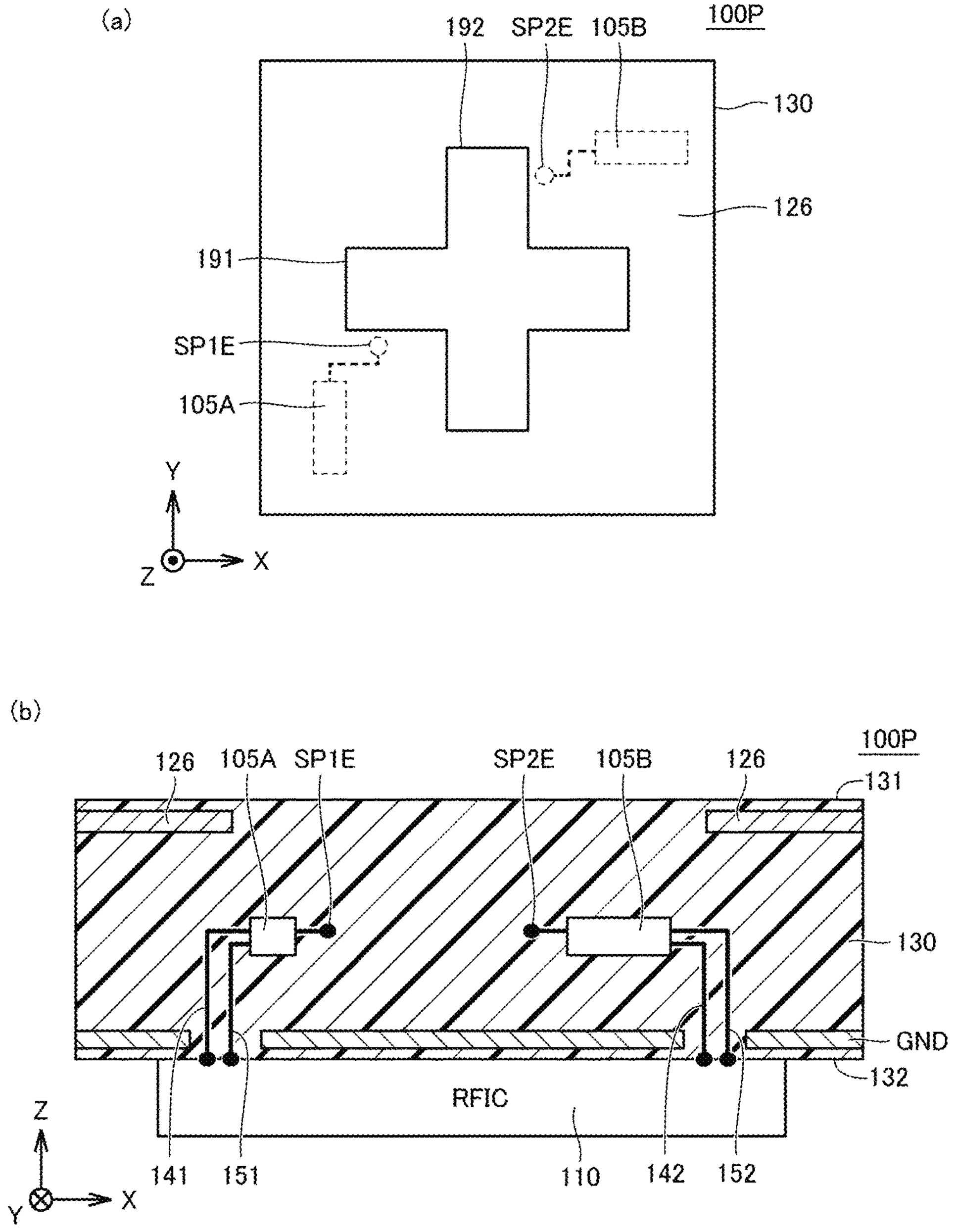
FIG. 31 is a plan view and a side perspective view of an antenna module according to Modification 9.

FIG. 31 represents a plan view (FIG. 31(*a*)) and a side perspective view (FIG. 31(*b*)) of an antenna module 100P according to Modification 9. As described above, in the antenna module 100P, a slot antenna is used as a radiation element.

With reference to FIG. 31, the antenna module 100P includes a feeding element 126 as a radiation element. The feeding element 126 has a rectangular shape in plan view of the antenna module 100P, and an opening 191 having a rectangular shape and extending in the X-axis direction and an opening 192 having a rectangular shape and extending in the Y-axis direction are formed near the center. Note that, as illustrated in FIG. 31(*a*), the opening 191 and the opening 192 intersect with each other to form an opening having a cross shape as a whole.

A radio frequency signal is supplied to a feeding section (electrode) SP1E disposed in a lower layer at a position close to a long side of the opening 191 in the feeding element 126, whereby a radio wave having a polarization direction in the X-axis direction is radiated. Further, a radio wave having a polarization direction in the Y-axis direction is radiated when a radio frequency signal is supplied to a feeding section (electrode) SP2E disposed in a lower layer at a position close to a long side of the opening 192 of the feeding element 126. Note that a radio frequency signal is transmitted from each of the feeding section SP1E and the feeding section SP2E to the feeding element 126 by using electromagnetic field coupling as in Modification 8 described above.

Then, the directional coupler 105A is formed on the feeding wiring line 141 that supplies a radio frequency signal to the feeding section SP1E, and the directional coupler 105B is formed on the feeding wiring line 142 that supplies a radio frequency signal to the feeding section SP2E. With such a configuration, even in the case of a slot antenna, a radio frequency signal to be supplied for each polarized wave can be detected. Further, by making the extending direction of the directional coupler 105A and the extending direction of the directional coupler 105B different from each other, it is possible to ensure isolation between the sub lines.

Modification 10

In each of the above-described embodiments and modifications, the configuration in which the dielectric substrate and the RFIC are integrated has been described. In Modification 10, an antenna module having a configuration in which the RFIC is separated from the dielectric substrate will be described.

Figure 32:
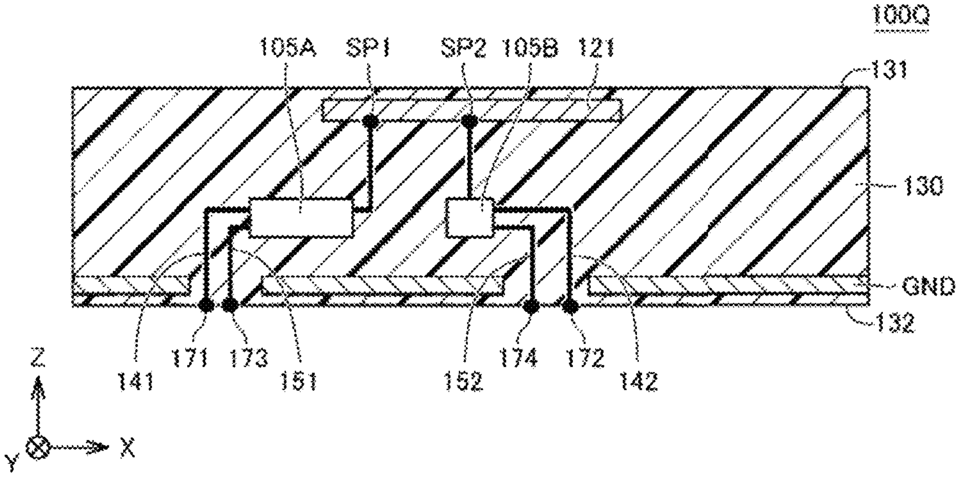
FIG. 32 is a side perspective view of an antenna module according to Modification 10.

FIG. 32 is a side perspective view of an antenna module 100Q according to Modification 10. The antenna module 100Q has a configuration in which the RFIC 110 of the antenna module 100 illustrated in FIG. 5 is removed. Further, in the antenna module 100Q, on the lower surface 132 of the dielectric substrate 130, connection terminals 171 and 172 for respectively connecting the feeding wiring lines 141 and 142 to an external device and connection terminals 173 and 174 for respectively connecting the coupling lines 151 and 152 to an external device are formed. Note that these connection terminals may be implemented as connectors.

In this manner, by separating the dielectric substrate and the RFIC from each other, it is possible to increase the degree of freedom of device arrangement in the communication device.

The "connection terminal 171" and the "connection terminal 172" of Modification 10 correspond to the "first terminal" and the "second terminal" in the present disclosure, respectively.

Note that, in each of the above-described embodiments and modifications, a configuration in which both the main line and the sub line in the directional coupler are disposed in the inner layer of the same dielectric substrate has been described. Such a configuration has advantages that it is easy to detect radio waves to be transmitted to and received from the antenna and to adjust the degree of coupling.

However, at least one of the main line and the sub line may be disposed outside the dielectric substrate. For example, the main line may be disposed in the dielectric substrate and the sub line may be formed in the RFIC. In this case, since the wiring line length between the sub line and the RFIC can be shortened, the conduction loss can be reduced, and the sensitivity of the directional coupler can be improved.

In addition, when both the main line and the sub line are formed in the RFIC, a distance between the radiation element and the ground electrode can be ensured in the dielectric substrate, and thus, antenna characteristics (in particular, a frequency band width) can be improved. Further, the sensitivity of the directional coupler can be improved by reducing the loss between the directional coupler and the RFIC.

The embodiments disclosed herein are to be considered in all respects as illustrative and not restrictive. The scope of the present disclosure is defined not by the description of the above-described embodiments but by the claims, and is intended to include all modifications within the meaning and scope equivalent to the claims.

REFERENCE SIGNS LIST

10, 10A COMMUNICATION DEVICE
20 MOUNTING SUBSTRATE
21 FIRST SURFACE
22 SECOND SURFACE
100, 100A to 100Q ANTENNA MODULE
101 DETECTOR
102 DISTORTION COMPENSATION CIRCUIT
105, 105A to 105F, 105X DIRECTIONAL COUPLER
106, 106A, 106B, 106E, 106F MAIN LINE
107, 107A, 107B, 107E, 107F SUB LINE
110 RFIC
111A to 111H, 113A to 113H, 117A, 117B SWITCH
112AR to 112HR LOW-NOISE AMPLIFIER
112AT to 112HT POWER AMPLIFIER
114A to 114H ATTENUATOR
115A to 115H PHASE SHIFTER
116A, 116B SIGNAL MULTIPLEXER/DEMULTIPLEXER
118A, 118B MIXER
119A, 119B AMPLIFIER CIRCUIT
120, 120A ANTENNA UNIT
121, 121A to 121D, 123 to 126 FEEDING ELEMENT
122 PARASITIC ELEMENT
130, 130A DIELECTRIC SUBSTRATE
131 UPPER SURFACE
132 LOWER SURFACE
135, 136 FLAT PORTION
137 BENT PORTION
137A CONNECTION PORTION
140 to 144 FEEDING WIRING LINE
150 to 153 COUPLING LINE
170 ELECTRODE
171 to 174 CONNECTION TERMINAL
180 to 182 FILTER DEVICE
191, 192 OPENING
200 BBIC
210, FLT1, FLT2 FILTER
211 to 213 LINE
ANT ANTENNA
GND, GND1, GND2 GROUND ELECTRODE

SP1 to SP4, SP1A to SP4A, SP1B, SP2B, SP1C, SP2C, SP1D, SP2D FEEDING POINT
SP1E, SP2E FEEDING SECTION
Z, Z0 to Z2 IMPEDANCE ELEMENT

The invention claimed is:

1. An antenna module comprising:
a radiation element fed from a first feeding section and a second feeding section;
a first feeding wiring line configured to convey a radio frequency signal from a feeding circuit to the first feeding section;
a second feeding wiring line configured to convey a radio frequency signal from the feeding circuit to the second feeding section;
a first directional coupler configured to detect a radio frequency signal supplied to the radiation element through the first feeding wiring line; and
a second directional coupler configured to detect a radio frequency signal supplied to the radiation element through the second feeding wiring line,
wherein a polarization direction of a radio wave to be radiated with the radio frequency signal supplied to the first feeding section is different from a polarization direction of a radio wave to be radiated with the radio frequency signal supplied to the second feeding section, wherein an extending direction of the first directional coupler is different from an extending direction of the second directional coupler.

2. The antenna module according to claim 1,
wherein each of the first directional coupler and the second directional coupler includes
a main line connected to a corresponding feeding wiring line, and
a sub line disposed in parallel to the main line and electromagnetically coupled to the main line,
the radiation element includes
a first element configured to radiate a radio wave in a first frequency band,
a second element configured to radiate a radio wave in a second frequency band different from the first frequency band, and
the antenna module further comprises
a first filter connected to the sub line in the first directional coupler and configured to pass a signal in the first frequency band and to attenuate a signal in the second frequency band, and
a second filter connected to the sub line in the second directional coupler and configured to pass a signal in the second frequency band and to attenuate a signal in the first frequency band.

3. The antenna module according to claim 2,
wherein each of the first element and the second element is a patch antenna having a flat plate shape,
the antenna module further comprising:
a ground electrode disposed in a manner to face the first element and the second element,
wherein the first element is a feeding element,
the second element is a parasitic element disposed between the first element and the ground electrode in a manner to face the feeding element, and
the first feeding wiring line and the second feeding wiring line pass through the second element and are connected to the first element.

4. The antenna module according to claim 2,
wherein the first element and the second element are feeding elements,
the first feeding wiring line connected to the main line of the first directional coupler is connected to the first feeding section of each of the first element and the second element, and
the second feeding wiring line connected to the main line of the second directional coupler is connected to the second feeding section of each of the first element and the second element.

5. The antenna module according to claim 4,
wherein each of the first element and the second element is a patch antenna having a flat plate shape,
the antenna module further comprises a ground electrode disposed in a manner to face the first element and the second element, and
the second element is disposed between the first element and the ground electrode in a manner to face the first element.

6. The antenna module according to claim 1,
wherein the radiation element includes a first feeding element and a second feeding element that are configured to radiate radio waves in a same frequency band and are disposed adjacent to each other,
the first feeding wiring line connected to the main line of the first directional coupler is connected to the first feeding section of each of the first feeding element and the second feeding element, and
the second feeding wiring line connected to the main line of the second directional coupler is connected to the second feeding section of each of the first feeding element and the second feeding element.

7. The antenna module according to claim 1,
wherein the radiation element includes a first feeding element and a second feeding element that are configured to radiate radio waves in a same frequency band and are disposed adjacent to each other, and
the first directional coupler and the second directional coupler are connected to the first feeding element, but are not connected to the second feeding element.

8. The antenna module according to claim 1, further comprising:
a dielectric substrate having a multilayer structure,
wherein the dielectric substrate includes
a first portion connected to the feeding circuit,
a second portion formed with the radiation element, and
a third portion coupled to the first portion and the second portion and having a thickness smaller than a thickness of the first portion and a thickness of the second portion, and
at least a part of each of the first directional coupler and the second directional coupler is formed in the third portion.

9. The antenna module according to claim 8,
wherein a normal direction of the first portion is different from a normal direction of the second portion, and
the third portion is bent.

10. The antenna module according to claim 1,
wherein the radiation element includes any one of a patch antenna having a flat plate shape, a linear antenna, or a slot antenna.

11. The antenna module according to claim 1, further comprising:
a first terminal that connects the first feeding wiring line and the feeding circuit; and
a second terminal that connects the second feeding wiring line and the feeding circuit.

12. The antenna module according to claim 1, further comprising:

a first terminal that connects the first feeding wiring line and the feeding circuit; and a second terminal that connects the second feeding wiring line and the feeding circuit.

13. The antenna module according to claim 1, further comprising:

the feeding circuit.

14. An antenna module comprising:

a radiation element fed from a first feeding section and a second feeding section;

a first feeding wiring line configured to convey a radio frequency signal from a feeding circuit to the first feeding section;

a second feeding wiring line configured to convey a radio frequency signal from the feeding circuit to the second feeding section;

a first directional coupler configured to detect a radio frequency signal supplied to the radiation element through the first feeding wiring line; and a second directional coupler configured to detect a radio frequency signal supplied to the radiation element through the second feeding wiring line, wherein a polarization direction of a radio wave to be radiated with the radio frequency signal supplied to the first feeding section is different from a polarization direction of a radio wave to be radiated with the radio frequency signal supplied to the second feeding section, wherein the first directional coupler includes a first main line connected to the first feeding wiring line, and a first sub line disposed parallel to the first main line and electromagnetically coupled to the first main line, the second directional coupler includes a second main line connected to the second feeding wiring line, and a second sub line disposed parallel to the second main line and electromagnetically coupled to the second main line, the first directional coupler extends in a same direction as an extending direction of the second directional coupler, and at least one of the first sub line and the second sub line is disposed at a position that is not between the first main line and the second main line.

15. The antenna module according to claim 14, further comprising:

a first terminal that connects the first feeding wiring line and the feeding circuit; and a second terminal that connects the second feeding wiring line and the feeding circuit.

16. An antenna module comprising:

a radiation element fed from a first feeding section and a second feeding section;

a first feeding wiring line configured to convey a radio frequency signal from a feeding circuit to the first feeding section;

a second feeding wiring line configured to convey a radio frequency signal from the feeding circuit to the second feeding section;

a first directional coupler configured to detect a radio frequency signal supplied to the radiation element through the first feeding wiring line; and a second directional coupler configured to detect a radio frequency signal supplied to the radiation element through the second feeding wiring line, wherein a polarization direction of a radio wave to be radiated with the radio frequency signal supplied to the first feeding section is different from a polarization direction of a radio wave to be radiated with the radio frequency signal supplied to the second feeding section, wherein at least a part of at least one of the first directional coupler or the second directional coupler overlaps the radiation element in plan view from a normal direction of the radiation element.

* * * * *